United States Patent
Andersson et al.

(10) Patent No.: US 10,716,078 B2
(45) Date of Patent: Jul. 14, 2020

(54) WIRELESS DEVICE, RADIO-NETWORK NODE, AND METHODS PERFORMED THEREIN FOR MANAGING SIGNALING IN A WIRELESS COMMUNICATION NETWORK

(71) Applicant: Telefonaktiebolaget LM Ericsson (publ), Stockholm (SE)

(72) Inventors: Håkan Andersson, Linköping (SE); Johan Kåredal, Lund (SE); Niclas Wiberg, Linköping (SE); Qiang Zhang, Täby (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 57 days.

(21) Appl. No.: 15/777,869

(22) PCT Filed: Sep. 27, 2016

(86) PCT No.: PCT/SE2016/050914
§ 371 (c)(1),
(2) Date: May 21, 2018

(87) PCT Pub. No.: WO2017/091123
PCT Pub. Date: Jun. 1, 2017

(65) Prior Publication Data
US 2018/0263004 A1    Sep. 13, 2018

Related U.S. Application Data

(60) Provisional application No. 62/259,412, filed on Nov. 24, 2015.

(51) Int. Cl.
*H04W 56/00* (2009.01)
*H04B 7/08* (2006.01)
(Continued)

(52) U.S. Cl.
CPC .......... *H04W 56/001* (2013.01); *H04B 7/088* (2013.01); *H04L 5/0007* (2013.01);
(Continued)

(58) Field of Classification Search
CPC ... H04W 56/001; H04W 24/10; H04W 24/00; H04W 16/28; H04W 56/00; H04W 16/18;
(Continued)

(56) References Cited

U.S. PATENT DOCUMENTS

2011/0279319 A1    11/2011   Takano et al.
2016/0135137 A1*    5/2016   Dalsgaard ............. H04W 56/00
                                                          370/350
2019/0058558 A1*    2/2019   Lee ........................ H04B 7/088

FOREIGN PATENT DOCUMENTS

EP    2938125 A1    10/2015
EP    2999141 A1    3/2016
(Continued)

OTHER PUBLICATIONS

3GPP, "3rd Generation Partnership Project; Technical Specification Group Radio Access Network; Evolved Universal Terrestrial Radio Access (E-UTRA); Physical Channels and Modulation (Release 11)", 3GPP TS 36.211 V11.3.0, Jun. 2013, 1-108.
(Continued)

*Primary Examiner* — Jae Y Lee
(74) *Attorney, Agent, or Firm* — Murphy, Bilak & Homiller, PLLC

(57) ABSTRACT

Embodiments herein relate a method performed by a first radio-network node (12) for managing signaling in a wireless communication network, the first radio-network node provides radio coverage over a first service area in the wireless communication network. The first radio-network node transmits a first beam reference signal, BRS, in the first service area, which first BRS comprises a number of repeti-
(Continued)

tive sequences of samples, of equal length, over an original time-domain representation of the first BRS.

22 Claims, 12 Drawing Sheets

(51) Int. Cl.
  *H04W 16/28* (2009.01)
  *H04L 5/00* (2006.01)
  *H04W 24/00* (2009.01)
  *H04W 24/10* (2009.01)
(52) U.S. Cl.
  CPC ............ *H04L 5/0048* (2013.01); *H04W 16/28* (2013.01); *H04W 24/00* (2013.01); *H04W 24/10* (2013.01)
(58) Field of Classification Search
  CPC .... H04W 74/00; H04L 5/0048; H04L 5/0007; H04B 7/088; H04B 7/2612
  See application file for complete search history.

(56) References Cited

FOREIGN PATENT DOCUMENTS

| | | |
|---|---|---|
| JP | 2013507889 A | 3/2013 |
| JP | 2015509305 A | 3/2015 |
| KR | 20130068868 A | 6/2013 |
| KR | 1020140133781 A | 11/2014 |
| KR | 20150016913 A | 2/2015 |
| RU | 2421910 C2 | 6/2011 |
| RU | 2459387 C1 | 8/2012 |
| RU | 2529554 C2 | 9/2014 |
| WO | 2015147717 A1 | 10/2015 |

OTHER PUBLICATIONS

Unknown, Author, "Considerations on reference signal design for NR", 3GPP TSG-RAN WGI Meeting #86, RI-167573, Gothenburg, Sweden, Aug. 22-26, 2016, 1-5.

* cited by examiner

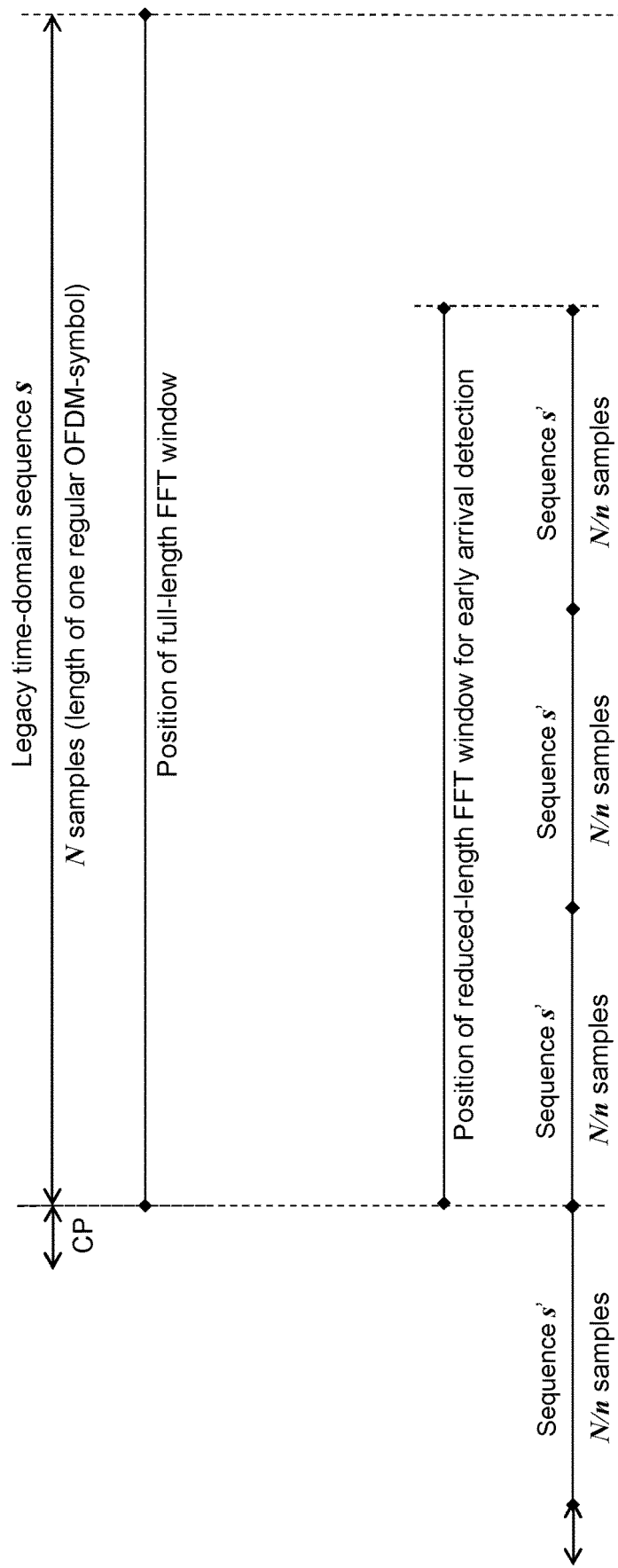

WIRELESS DEVICE, RADIO-NETWORK NODE, AND METHODS PERFORMED THEREIN FOR MANAGING SIGNALING IN A WIRELESS COMMUNICATION NETWORK

TECHNICAL FIELD

Embodiments herein relate to a wireless device, a first radio-network node and methods performed therein regarding wireless communication. Furthermore, a computer program and a computer-readable storage medium are also provided herein. In particular, embodiments herein relate to managing signaling, such as performing signaling or performing network planning e.g. determining whether to perform a handover or similar, in a wireless communication network.

BACKGROUND

In a typical wireless communication network, wireless devices, also known as wireless communication devices, mobile stations, stations (STA) and/or user equipments (UE), communicate via a Radio-access Network (RAN) to one or more core networks (CN). The RAN covers a geographical area which is divided into areas or cell areas, with each area or cell area being served by radio-network node such as an access node e.g., a Wi-Fi access point or a radio base station (RBS), which in some networks may also be called, for example, a "NodeB" or "eNodeB". The area or cell area is a geographical area where radio coverage is provided by the access node. The access node operates on radio frequencies to communicate over an air interface with the wireless devices within range of the access node. The access node communicates over a downlink (DL) to the wireless device and the wireless device communicates over an uplink (UL) to the access node.

A Universal Mobile Telecommunications System (UMTS) is a third generation telecommunication network, which evolved from the second generation (2G) Global System for Mobile Communications (GSM). The UMTS terrestrial radio-access network (UTRAN) is essentially a RAN using wideband code division multiple access (WCDMA) and/or High-Speed Packet Access (HSPA) for communication with user equipments. In a forum known as the Third Generation Partnership Project (3GPP), telecommunications suppliers propose and agree upon standards for present and future generation networks and UTRAN specifically, and investigate enhanced data rate and radio capacity. In some RANs, e.g. as in UMTS, several access nodes may be connected, e.g., by landlines or microwave, to a controller node, such as a radio-network controller (RNC) or a base station controller (BSC), which supervises and coordinates various activities of the plural access nodes connected thereto. The RNCs are typically connected to one or more core networks.

Specifications for the Evolved Packet System (EPS) have been completed within the 3$^{rd}$ Generation Partnership Project (3GPP) and this work continues in the coming 3GPP releases, such as 4G and 5G networks. The EPS comprises the Evolved Universal Terrestrial Radio-Access Network (E-UTRAN), also known as the Long-Term Evolution (LTE) radio-access network, and the Evolved Packet Core (EPC), also known as System Architecture Evolution (SAE) core network. E-UTRAN/LTE is a 3GPP radio-access technology wherein the access nodes are directly connected to the EPC core network. As such, the Radio-Access Network (RAN) of an EPS has an essentially "flat" architecture comprising access nodes connected directly to one or more core networks.

With the emerging 5G technologies such as New Radio (NR), the use of very many transmit- and receive-antenna elements is of great interest as it makes it possible to utilize transmit- and receive beamforming. Transmit-side beamforming means that the transmitter can amplify the transmitted signals in a selected direction or directions, while suppressing the transmitted signals in other directions. Similarly, on the receive side, a receiver can amplify signals from a selected direction or directions, while suppressing unwanted signals from other directions.

Beamforming allows the signal to be stronger for an individual connection. On the transmit side this may be achieved by a concentration of the transmitted power in the desired direction(s), and on the receive side this may be achieved by an increased receiver sensitivity in the desired direction(s). This beamforming enhances throughput and coverage of the connection. It also allows reducing the interference from unwanted signals, thereby enabling several simultaneous transmissions over multiple individual connections using the same resources in the time-frequency grid, so-called multi-user Multiple Input Multiple Output (MIMO).

A problem with beamforming is to decide which beam(s) to use for transmission and/or reception. To support Transmit (Tx) side beamforming at a radio-network node, a number of reference signals may be transmitted from the radio-network node, whereby the wireless device can measure signal strength or quality of these reference signals and report the measurement results to the radio-network node. The radio-network node may then use these measurements to decide which beam(s) to use for one or more wireless devices.

A combination of periodic and scheduled reference signals may be used for this purpose.

The periodic reference signals, typically called beam reference signals (BRS), are transmitted repeatedly, in time, in a large number of different directions using as many Tx-beams as deemed necessary to cover an operational area of the radio-network node. As the naming indicates, each BRS represents a unique Tx-beam from that radio-network node. This allows a wireless device to measure the BRSs when received in different beams, without any special arrangement for that wireless device from the radio-network node perspective. The wireless device reports information e.g. the received powers for different BRSs, or equivalently different Tx-beams, back to the radio-network node. The radio-network node may then transmit dedicated signals to that wireless device using one or more beams that are reported as strong for that wireless device. Because the BRSs are transmitted repeatedly, with a repetition period, over a large number of beams, the repetition period has to be relatively long to avoid using too many resources per time unit for the BRSs.

The scheduled reference signals, called channel-state information reference signals (CSI-RS), are transmitted only when needed for a particular connection. The decision when and how to transmit the CSI-RS is made by the radio-network node and the decision is signalled to the involved wireless devices using a so-called measurement grant. When the wireless device receives a measurement grant it measures on a corresponding CSI-RS. The radio-network node may choose to transmit CSI-RSs to a wireless device only using beam(s) that are known to be strong for that wireless device, to allow the wireless device to report more detailed information about those beams.

Alternatively, the radio-network node may choose to transmit CSI-RSs also using beam(s) that are not known to be strong for that wireless device, for instance to enable fast detection of new beam(s) in case the wireless device is moving.

The radio-network nodes of a NR network transmit other reference signals as well. For instance, the radio-network nodes may transmit so-called demodulation reference signals (DMRS) when transmitting control information or data to a wireless device. Such transmissions are typically made using beam(s) that are known to be strong for that wireless device.

As stated above, beamforming is not restricted to the radio-network node. It can also be implemented as Receive (Rx)-side beamforming in the wireless device, further enhancing the received signal and suppressing interfering signals. Care must then be taken to compare different Tx-beams only when the BRS is known to be received using the same (or similar) receive beams, otherwise the difference in received power may depend on the used receive beam rather than on the transmit beam.

When the wireless device is connected to a wireless communication network, the wireless device tries to maintain a time synchronization with the wireless communication network. This is facilitated by the radio-network node, which periodically transmits so-called synchronization signals. In LTE, these synchronization signals are defined by the standard and the wireless device constantly monitors these synchronization signals and adjusts its synchronization based on this monitoring. Typically, the monitoring consists of having a signal correlator searching for the synchronization signals directly in the time-domain. A similar solution is envisioned for the NR standard.

For the wireless device to be in synch means that the wireless device knows when subframe boundaries and/or Orthogonal Frequency-Division Multiplexing (OFDM) symbol boundaries will occur, and hence, the wireless device can adjust a subsequent signal processing to these boundaries. The first, and probably most important step, is to adjust a precise positioning in time of a Fast Fourier Transform (FFT)-window when transforming the received signal to the frequency-domain. If a wireless device moves such that a propagation delay from the radio-network node to the wireless device changes, the positioning of the FFT-window must change and it is the synchronization signals that provide the means to achieve this.

As described above, a wireless device must monitor the BRS transmitted from the radio-network node in order to report back the BRS received power (BRS-RP) so that the radio-network node can decide which Tx-beams to use for data transmission. The BRSs are unique to each radio-network node, at least locally within a reasonably large geographical area, so that a wireless device can measure and report BRS-RP on beams from a neighboring transmission point without ambiguity. This is necessary in order to support mobility between radio-network nodes.

A problem with existing solutions is that in order to measure accurately on a BRS the wireless device must be in synch with the radio-network node transmitting the BRS. However, in order to support mobility of the wireless device between radio-network nodes, it must be possible for the wireless device to measure on BRSs from more than one radio-network node, and be in sync with each of these radio-network nodes. If this is not achieved the communication will fail resulting in a limited or reduced performance of the wireless communication network.

SUMMARY

An object of embodiments herein is to provide a mechanism that improves the performance of the wireless communication network by managing the signaling in the wireless communication network.

According to an aspect the object is achieved by providing a method performed by a first radio-network node for managing signaling in a wireless communication network. The first radio-network node provides radio coverage over a first service area in the wireless communication network. The first radio-network node transmits a first BRS, in the first service area, which first BRS comprises a number of repetitive sequences of samples, of equal length, over an original time-domain representation of the first BRS.

According to another aspect the object is achieved by providing a method performed by a wireless device for managing signaling in a wireless communication network. The wireless device receives, from a first radio-network node, a first BRS, in a first service area of the wireless communication network, which first BRS comprises a number of repetitive sequences of samples, of equal length, over an original time-domain representation of the first BRS.

According to yet another aspect the object is achieved by providing a method performed by a first radio-network node for managing signaling in a wireless communication network. The first radio-network node provides radio coverage over a first service area and serves a wireless device. The first radio-network node transmits a first BRS and a first synchronization signal to the wireless device. The first radio-network node further receives, from the wireless device, reception information regarding the first BRS and the first synchronization signal, and a second BRS and a second synchronization signal from a second radio-network node providing radio coverage over a second service area. The reception information indicates a timing information regarding a timing difference between the received, at the wireless device, first and second synchronization signals, and/or the reception information indicates that the wireless device has received the first and the second BRS. The first radio-network node further performs network planning based on the reception information.

According to still another aspect the object is achieved by providing a method performed by a wireless device for managing signaling in a wireless communication network. The wireless device is served by a first radio-network node providing radio coverage over a first service area. The wireless device receives a first BRS and a first synchronization signal from the first radio-network node. The wireless device further receives a second BRS, and a second synchronization signal from a second radio-network node providing radio coverage over a second service area. Furthermore, the wireless device transmits, to the first radio-network node, reception information regarding the first BRS and the first synchronization signal, and the second BRS and the second synchronization signal. The reception information indicates a timing information regarding a timing difference between the received first and second synchronization signals, and/or the reception information indicates that the wireless device has received the first and the second BRS.

It is herein also provided a computer program comprising instructions, which, when executed on at least one processor, cause the at least one processor to carry out the methods herein, as performed by the wireless device or the first radio-network node. Furthermore, it is herein provided a computer-readable storage medium, having stored thereon a computer program comprising instructions which, when executed on at least one processor, cause the at least one processor to carry out the methods herein, as performed by the wireless device or the first radio-network node.

According to still another aspect the object is achieved by providing a first radio-network node for managing signaling in a wireless communication network. The first radio-network node is configured to provide radio coverage over a first service area in the wireless communication network. The first radio-network node is further configured to transmit a first BRS in the first service area, which first BRS comprises a number of repetitive sequences of samples, of equal length, over an original time-domain representation of the first BRS.

According to yet still another aspect the object is achieved by providing a wireless device for managing signaling in a wireless communication network. The wireless device is configured to receive from a first radio-network node, a first BRS in a first service area of the wireless communication network, which first BRS comprises a number of repetitive sequences of samples, of equal length, over an original time-domain representation of the first BRS.

According to yet another aspect the object is achieved by providing a first radio-network node for managing signaling in a wireless communication network, wherein the first radio-network node is configured to provide radio coverage over a first service area and to serve a wireless device. The first radio-network node is further configured to transmit a first BRS and a first synchronization signal to the wireless device. The first radio-network node is further configured to receive from the wireless device, reception information regarding the first BRS and the first synchronization signal, and a second BRS and a second synchronization signal from a second radio-network node providing radio coverage over a second service area. The reception information indicates a timing information regarding a timing difference between the received, at the wireless device, first and second synchronization signals, and/or the reception information indicates that the wireless device has received the first and the second BRS. The first radio-network node is further configured to perform network planning based on the reception information.

According to yet another aspect the object is achieved by providing a wireless device for managing signaling in a wireless communication network, wherein the wireless device is configured to be served by a first radio-network node providing radio coverage over a first service area. The wireless device is configured to receive a first BRS and a first synchronization signal from the first radio-network node. The wireless device is further configured to receive a second BRS and a second synchronization signal from a second radio-network node providing radio coverage over a second service area. Furthermore, the wireless device is configured to transmit to the first radio-network node, reception information regarding the first BRS and the first synchronization signal, and the second BRS and the second synchronization signal, which reception information indicates a timing information regarding a timing difference between the received first and second synchronization signals, and/or the reception information indicates that the wireless device has received the first and the second BRS.

By providing the embodiments herein one or more of the following advantages are achieved:

Given the repetitive sequences of the first and second BRSs, the out-of-synch tolerances for when it is still possible to measure on neighboring radio-network nodes is greatly extended compared to conventional BRS design, as e.g. the CP is extended by one or more repetitive sequences.

Since the wireless device reports the reception information, the radio-network node will know which radio-network nodes may be utilized when performing network planning e.g. for simultaneous transmission to the wireless device, and which radio-network nodes will require resynchronization, possibly in the form of a random-access procedure, to switch between.

These advantages may, one by one or in combination, result in an improved performance of the wireless communication network.

BRIEF DESCRIPTION OF THE DRAWINGS

Embodiments will now be described in more detail in relation to the enclosed drawings, in which:

FIG. 3c shows a BRS received very close to the second radio network node according to embodiments herein;

DETAILED DESCRIPTION

Figure 1:
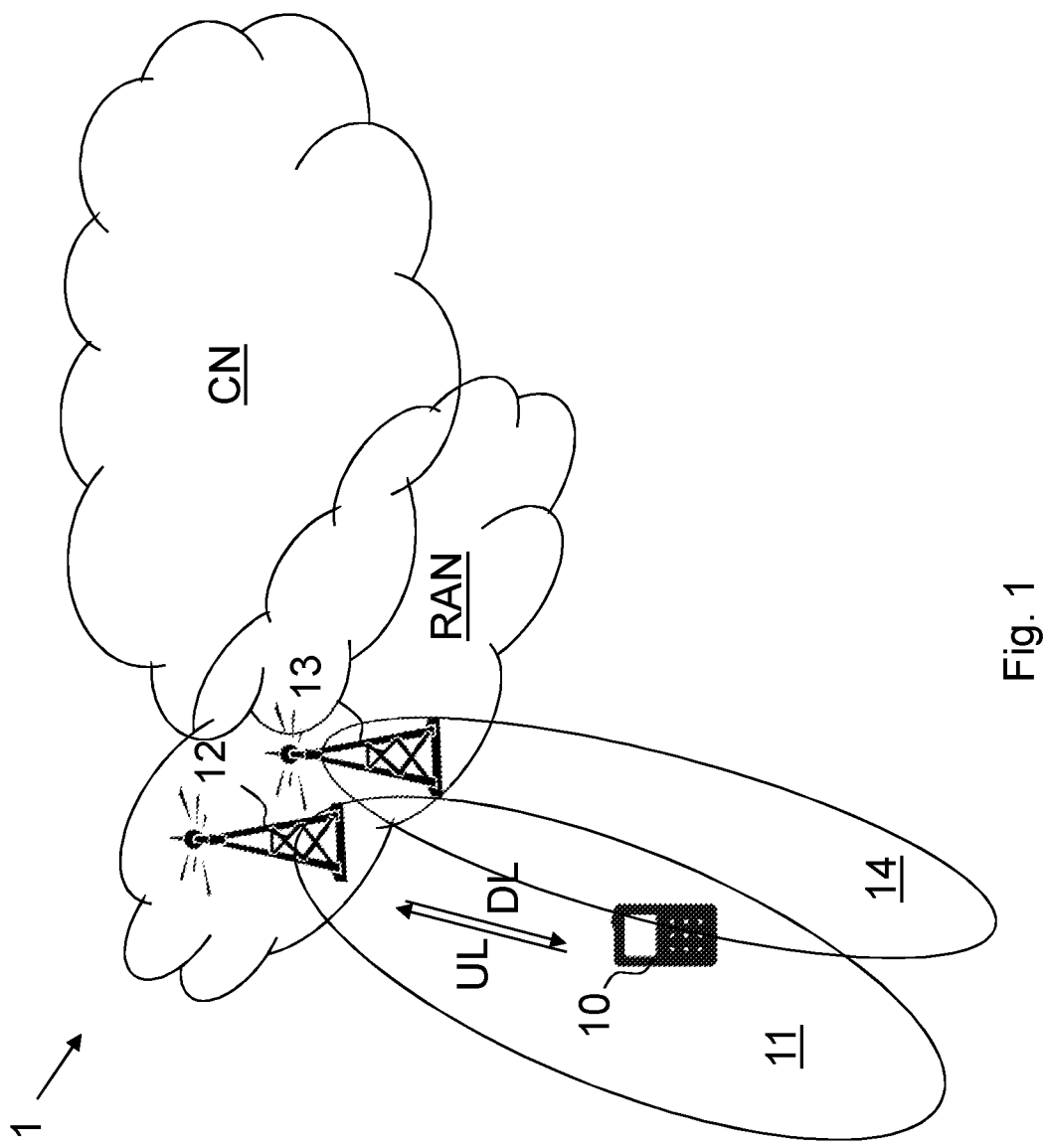
FIG. 1 shows a schematic overview depicting a wireless communication network according to embodiments herein.

Embodiments herein relate to wireless communication networks in general. FIG. 1 is a schematic overview depicting a wireless communication network 1. The wireless communication network 1 comprises one or more RANs and one or more CNs. The wireless communication network 1 may use one or a number of different technologies, such as NR, Wi-Fi, LTE, LTE-Advanced, Fifth Generation (5G), Wideband Code-Division Multiple Access (WCDMA), Global System for Mobile communications/enhanced Data rate for GSM Evolution (GSM/EDGE), Worldwide Interoperability for Microwave Access (WiMax), or Ultra Mobile Broadband (UMB), just to mention a few possible implementations. Embodiments herein relate to recent technology trends that are of particular interest in a NR context, however, embodiments are also applicable in further development of the existing wireless communication systems such as e.g. WCDMA and LTE.

In the wireless communication network 1, wireless devices e.g. a wireless device such as a mobile station, a non-access point (non-AP) STA, a STA, a user equipment and/or a wireless terminal, communicate via one or more Access Networks (AN), e.g. RAN, to one or more core networks (CN). It should be understood by the skilled in the art that "wireless device" is a non-limiting term which means any terminal, wireless communication terminal, user equipment, Machine-Type Communication (MTC) device, Device-to-Device (D2D) terminal, or node e.g. smart phone, laptop, mobile phone, sensor, relay, mobile tablets or even a small base station capable of communicating using radio communication with a network node within an area served by the network node.

The wireless communication network 1 comprises a first radio-network node 12 providing radio coverage over a geographical area, a first service area 11, of a first radio-access technology (RAT), such as NR, LTE, Wi-Fi, WiMAX or similar. The first radio-network node 12 may be a transmission and reception point e.g. a radio-network node such as a Wireless Local-Area Network (WLAN) access point or an Access Point Station (AP STA), an access node, an access controller, a base station, e.g. a radio base station such as a NodeB, an evolved Node B (eNB, eNode B), a base transceiver station, a radio remote unit, an Access Point Base Station, a base station router, a transmission arrangement of a radio base station, a stand-alone access point or any other network unit or node capable of communicating with a wireless device within the area served by the first radio-network node 12 depending e.g. on the first radio-access technology and terminology used. The wireless device 10 is served by the first radio-network node 12. The first radio-network node 12 may be referred to as a serving network node wherein the first service area may be referred to as a serving area, and the serving network node communicates with the wireless device 10 in form of DL transmissions to the wireless device 10 and UL transmissions from the wireless device 10.

A second radio-network node 13 may further provide radio coverage over a second service area 14. It should be noted that a service area may be denoted as cell, beam, beam group or similar to define an area of radio coverage.

The first and second radio-network nodes transmit one or more beam reference signals (BRS), repeatedly, in time. Each BRS represents a unique Tx-beam from that corresponding radio-network node, e.g. a first BRS from the first radio-network node 12 and a second BRS from the second radio-network node 13. It should be noted that there may be one or several BRSs from the first radio network node as well as there may be one or several BRSs from the second radio network node. All of the BRSs are uniquely identifiable both regarding which radio network node they are transmitted from and which beam it is from that radio network node. A CP that is present in OFDM-based transmission schemes of the BRSs provides some leeway for the timing accuracy necessary when measuring, but when a distance between the wireless device 10 and the radio-network nodes reaches a certain point this is not enough. The problem is accentuated in NR as the frequencies tend to be higher, with correspondingly shorter reach, thus forcing a use of a larger number of radio-network nodes in the wireless communication network. Consequently, the number of necessary hand-overs increases.

Embodiments herein provide a BRS, e.g. the first and the second BRS, which BRS comprises a number of repetitive sequences over an original time-domain representation of the BRS, e.g. a symbol interval such as an OFDM symbol, wherein the repetitive sequences are of equal length. The BRS may further comprises a cyclic prefix comprising a first subsequence of a number of samples in an end of the original time-domain representation of the BRS e.g. a number of consecutive samples of the last samples in the OFDM symbol. Hence, the BRS is a number of repetitive sequences that stretches throughout the whole original time-domain representation of the BRS and the BRS may have the first subsequence as initiating samples. This design of the BRS enables that a much longer effective CP may be used which enables the wireless device 10 to measure on BRSs from radio-network nodes that are further away, i.e. BRSs that have longer propagation delay, compared to what is possible with existing designs. Effective CP herein meaning that the CP is prolonged with one or more repetitive sequence of the BRS. Furthermore, this design of the BRS further enables that a wireless device can measure on BRSs from radio-network nodes that are closer, and thus have shorter propagation delay, compared to what is possible with existing designs.

As the wireless device 10 is served by the first radio-network node 12 the wireless device is thus synchronized to the first radio-network node 12. The first radio-network node 12 thus transmits a first synchronization signal that the wireless device 10 receives and gets synchronized with the first radio network node 12. When entering into the second service area 14 the first radio-network node also receives a second synchronization signal from the second radio-network node 13. According to embodiments herein wireless device 10 may obtain a timing information regarding a timing difference between received first and second synchronization signals. For example, the wireless device measures a time between receiving the first synchronization signal and the second synchronization signal. The wireless device 10 then transmits, to the first radio-network node 12, reception information regarding the first synchronization signal and the second synchronization signal, wherein the reception information indicates the timing information regarding the timing difference between the received first and second synchronization signals. For example, the wireless device 10 may transmit the measured time difference or each time stamp when received. The first radio-network node 12 may then perform network planning such as determine whether or how to perform a mobility process of the wireless device 10 to the second radio-network node, or determine whether to perform data transmission to the wireless device 10 using more than one beam e.g. using the first and the second radio-network node, based on the reception information. The mobility process may be a handover, a cell reselection, or similar.

Additionally, the wireless device 10 may receive the first BRS from the first radio-network node 12 and may further receive, from the second radio-network node 13, the second BRS. The wireless device 10 may then transmit the reception information regarding the first BRS and the second BRS, which reception information may, in addition to or alternatively to the timing information mentioned above, indicate that the wireless device 10 has received the first and the second BRS. The first radio-network node 12 may then perform network planning, such as data transmission to the wireless device from both the radio-network nodes, based on the reception information.

Hence, reporting of the reception information such as the timing differences between radio-network nodes, or the more simplistic approach of pointing out which radio nodes can be received simultaneously i.e. received BRSs, enables the network to plan joint transmission and the issuing of resynchronization or random-access commands so-called network planning.

Note that in a general scenario the term "radio-network node" can be substituted with "transmission point". The key observation is that it must be possible to make a distinction between the transmission points (TPs), typically based on different synchronization signals and/or BRSs transmitted. Several TPs may be logically connected to the same radio-network node but if they are geographically separated (or pointing in different propagation directions) they will be subject to the same mobility issues as different radio-network nodes. In subsequent sections, the terms "radio-network node" and "TP" can be thought of as interchangeable.

The proposed solutions enable e.g. the wireless communication network to better utilize multi-point transmission and improve handling of hand-over between radio-network nodes.

Figure 2:
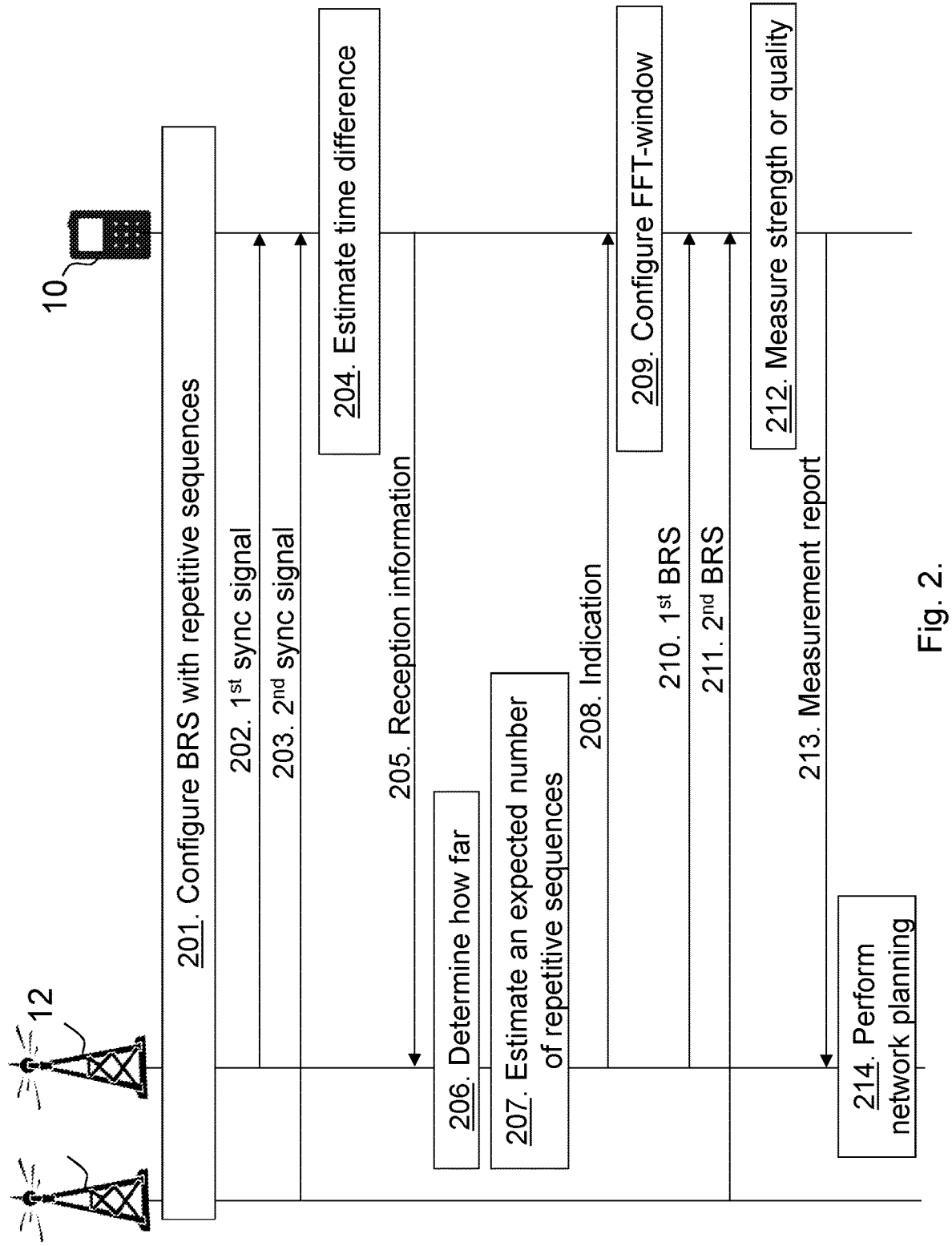
FIG. 2 is a schematic combined flowchart and signaling scheme according to embodiments herein.

FIG. 2 is a combined flowchart and signaling scheme according to embodiments herein.

Action 201. The first radio-network node 12 configures the wireless device 10 and itself to use a BRS construction, wherein the BRS comprises a number of repetitive sequences over the original time-domain representation e.g. an OFDM symbol, of equal length. This BRS structure is further configured also for the second radio-network node 13. The BRS may further comprise a cyclic prefix comprising a first subsequence of a number of samples in an end of the OFDM symbol e.g. a number of consecutive samples of the last samples in the OFDM symbol. Thus, the original time-domain representation of the BRS may comprise of a number of identical sequences or the original time-domain representation of the BRS may comprise the number of identical sequences wherein each sequence comprises a same number of samples. The number may be adaptive based on an expected propagation delay of the BRS to be measured. The first radio network node may e.g. broadcast system information indicating the use of the BRS construction according to embodiments herein.

Action 202. The first radio-network node 12 transmits, to the wireless device 10, the first synchronization signal over the first service area 11. Since the wireless device 10 is synchronized with the first radio-network node the BRS from the serving first radio-network node will be in synch. Hence, the wireless device 10 will always use a full FFT-window the length of which equals the length of the original time-domain representation.

Action 203. The second radio-network node 13 transmits, to the wireless device 10, the second synchronization signal over the second service area 14. Cell-ID or similar of the service areas may be used to create and distinguish between the synchronization signals.

Action 204. The wireless device 10 may measure, estimate or obtain the time difference between the received first and second synchronization signals. The synchronization signals from the radio-network nodes may be unique, at least over a reasonably large geographical area, such that the synchronization signals identify each corresponding radio-network node and the corresponding transmitted BRS, as well as give the necessary timing information.

Action 205. The wireless device 10 then transmits, to the first radio-network node 12, the reception information indicating the time difference between the received first synchronization signal and the second synchronization signal.

Action 206. The first radio-network node 12 may then determine, based on the received reception information, how far the wireless device 10 is from the second radio-network node 13, or actually, how unsynchronized the wireless device is with the second radio-network node 13.

Action 207. From this determination the first radio-network node 12 estimates or determines an expected number of repetitive sequences of samples of the second BRS of the second radio-network node 13, the wireless device 10 is able to receive.

Action 208. The first radio-network node 12 transmits, to the wireless device 10, an indication indicating the expected number of repetitive sequences of samples of the second BRS. For example, the first radio-network node may signal, to the wireless device 10, a FFT-window size for the second BRS coming from the second radio-network node. The FFT-window size is estimated taking the timing difference into account, for example, the FFT-window size is reduced with a number of samples that corresponds to the length of one repetitive sequence of the second BRS. Hence, the FFT-window size may be reduced by e.g. one repetitive sequence for the second BRS compared to the FFT-window size for the first BRS.

It should be noted that there may be several BRSs from the same radio-network node or multiple radio-network nodes that the wireless device 10 measures on. Hence, the first radio-network node 12 may transmit the expected number of repetitive sequence, also known as useful FFT-window size, for each radio-network node that the wireless device has reported reception information about.

The structure of the BRSs is the same all over the wireless communication network. Thus, the number of sequence repetitions making up the BRSs may be a network-wide configuration parameter. The cell-ID or similar may be used to create and distinguish between the BRSs. So when the wireless device 10 hears and decodes a synchronization signal the wireless device 10 also knows precisely what the BRS transmitted from that radio-network node looks like. All radio-network nodes may know the Cell-ID of all neighboring cells.

Action 209. The wireless device 10 receives the indication and may configure e.g. the FFT-window accordingly.

Action 210. The first radio-network node 12 transmits the first BRS with the configured BRS construction. I.e. the first radio-network node 12 transmits the first BRS e.g. with a CP comprising the first subsequence of a number of samples followed by the number of repetitive sequences over the symbol interval.

Action 211. In addition, the second radio-network node 13 transmits the second BRS with the configured BRS construction. I.e. the second radio-network node 13 transmits the second BRS e.g. with a CP comprising the first subsequence of a number of samples followed by the number of repetitive sequences over the symbol interval. Then the wireless device 10 receives, from the second radio-network node 13, the second BRS, but applies an FFT-window of instructed length. Thus the wireless device 10 receives in the FFT-window with reduced length, configured in action 209, the expected number of repetitive sequences of samples of the second BRS. E.g. the wireless device 10 considers a useful time-domain representation for the second BRS to be the original time-domain representation of the first BRS reduced by e.g. one repetitive sequence.

Action 212. The wireless device 10 may then measure a strength or quality e.g. measure received energy, SINR, or similar, of the first and second BRSs. As an example, the wireless device 10 may use the remaining three repetitive sequences of the second BRS out of the four repetitive sequences over the original time-domain representation, to perform measurements on.

Action 213. The wireless device 10 may further transmit a measurement report to the first radio-network node 12, which measurement report indicates the measured strength or quality of the first and second BRSs.

Action 214. The first radio-network node 12 may then use the received measurement report when performing network planning such as hand-over planning, data transmission planning, etc. The first radio-network node 12 may scale the strength or quality measured when using shorter BRS to reflect the situation had full-length BRS been used with a receiver in synch.

Figure 3A:
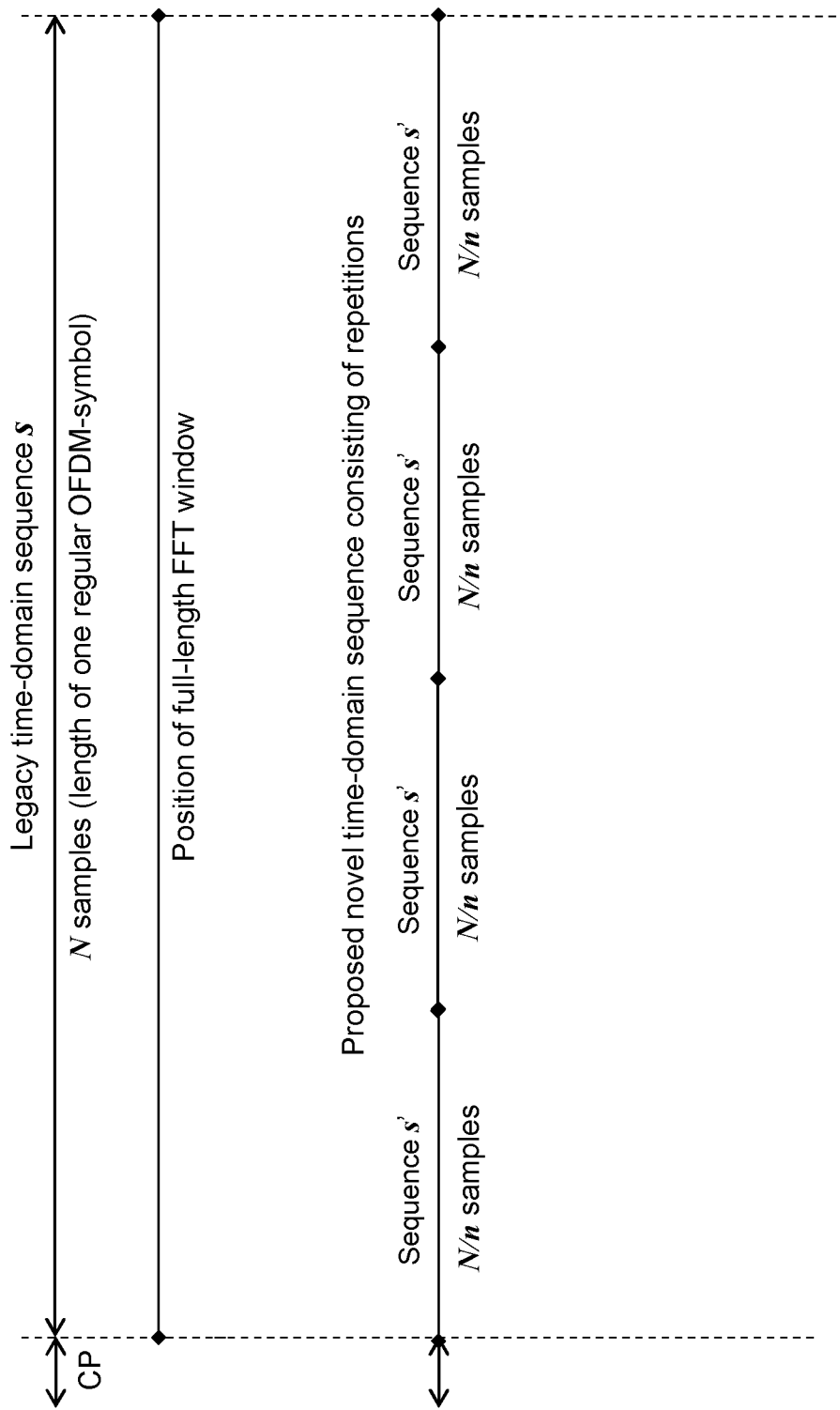
FIG. 3a shows a BRS according to embodiments herein.

BRS design is illustrated in FIG. 3a. In existing designs, a BRS may consist of N samples given as a time-domain sequence S, where N is the length of one OFDM-symbol. Typically, N=2048, which is then also the length of the FFT that is used to convert the received signal from the time-domain to the frequency-domain. Prior to transmission a CP is appended before the N samples. It consists of $N_{CP}$ samples taken from the end of the original sequence of N samples. A typical value of $N_{CP}$=144. See the top part of FIG. 3a for an illustration.

A length of the CP determines a tolerance to delays of the received signal in the receiver. Essentially, the time duration of the CP gives the delay tolerance. The longer the CP the longer delays can be handled in the receiver using a single time synchronization. However, a longer CP means less efficient use of the channel and reduced maximum achievable data rate.

In the case of measuring BRS from the second radio-network node 13 that is not time-synchronized with the receiver in the wireless device 10, the measurement is still accurate if the signal is not delayed more than the length of the CP. According to embodiments herein, in order to be able to perform measurements on BRSs from radio-network nodes further away, a special design of the BRS is herein provided. A time-domain representation of the BRS, denoted S, may be constructed such that it consists of n identical sequences S' each of length N/n. This is illustrated in FIG. 3a using n=4, which in the example makes the length of S' be N'=2048/4=512 samples.

Figure 3B:
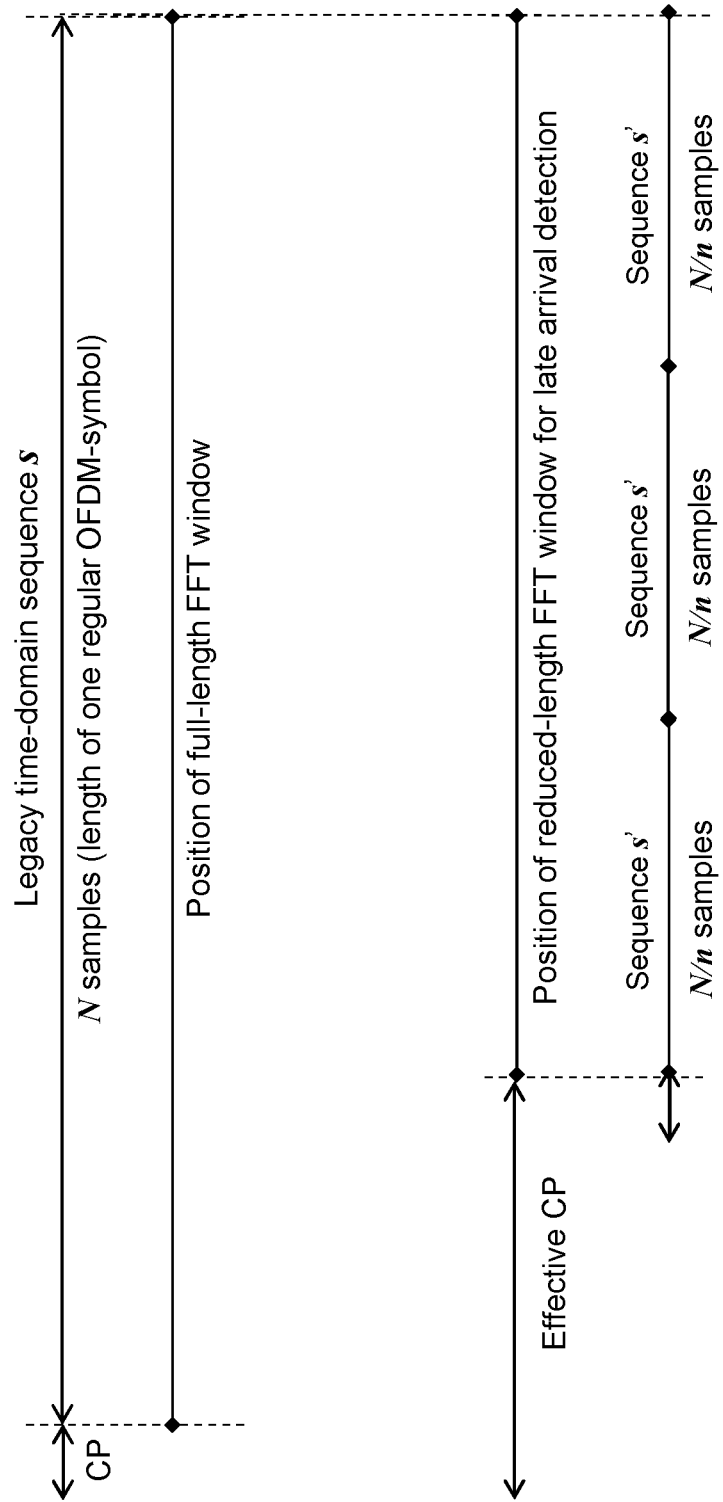
FIG. 3b shows a BRS received far away from the second radio network node according to embodiments herein.

When the wireless device 10 knows that it is measuring a BRS of this design which originates from a radio-network node that potentially has a propagation delay that is larger than the normal CP it can utilize the following technique, illustrated in FIG. 3b. Consider the useful time-domain sequence of the BRS to be the n−1 last repetitions of S' consisting of 1536 samples. Then the effective CP for this signal can be seen as the original CP plus the first instance of S', effectively giving a CP-length of 144+512=656 samples. This increases the delay tolerance substantially, thus enabling measurements, at the wireless device 10, of BRSs from radio-network nodes positioned further away.

The wireless device may determine number of sequences to expect to receive by performing time-correlation, or some other measurements, of the synch signals coming from the radio-network nodes. If the synch signals from other radio-network nodes are not heard, then the chances that the BRSs will be heard are very slim. Typically, the wireless device 10 has a time-domain correlator that is always running and constantly searches for any available synch signals so it will have a good chance of finding nearby radio-network nodes and the correlation process also gives an estimate of the delay, which means that the number of sequences of the BRS to utilize can be deduced.

The information on what radio-network nodes, such as TPs, to measure on may also be signalled to the wireless device 10 by the first radio-network node 12, since the first radio-network node has this knowledge.

The shortened effective length of the BRS sequence means that a shorter FFT may be employed, and hence, that less potential signal energy may be collected in the receiver but embodiments herein enable to measure on BRSs from neighboring radio-network nodes and thereby facilitating multi-TPs and hand-over handling in the radio-network node without having to re-synch the receiver of the wireless device 10. The actual BRS-RP values obtained when using shorter sequences can be scaled to reflect the situation had full-length sequences been used with a receiver in synch.

The number of repetitions, n, of the repeated sequence S' may be adjustable depending on the possible desired lengths of the effective CP. More repetitions make the granularity of the effective CP finer as one can always choose to include more than one S' in the effective CP. However, as the sequence length gets shorter the effective number of sub-carriers in each BRS becomes smaller thus decreasing the degrees of freedom for constructing BRS sequences with good mutual-distance properties.

In conclusion, the length of S', or alternatively worded, the number of repetitions n, as well as the number of repetitions utilized in the effective CP can be adaptive based on the expected propagation delay of the BRS to be measured. This information may, e.g., be available from a time-domain correlator that searches for synchronization signals from different TPs, see below.

In a typical urban scenario, a wireless device may be moving along a street surrounded by high-rise buildings, a.k.a. a "street canyon". For example, the wireless device 10 has Line-of-Sight (LoS) conditions to the serving radio-network node 12 but is moving away from the serving radio-network node 12. When the wireless device 10 e.g. approaches a street corner the signal from a different radio-network node located "around the corner" may suddenly become strong. In this scenario it is quite likely that the propagation delay from the different radio-network node is (much) shorter than what it is from the serving radio-network node 12.

In this situation it would be beneficial for the wireless device 10 to be able to accurately measure strength or quality from the different radio-network node. However, given the shorter propagation delay the signals arrive "too early" and cannot be accurately measured using the delay-tolerance mechanism that the CP provides. In this situation the construction of S as a number of short sequences, according to embodiments herein, again provides a solution, see FIG. 3c. Now consider the useful time-domain sequence of the BRS to be original CP plus n−1 repetitions of S' consisting of 144+3*512=1680 samples. Or, in order to have the same length FFT as in the delay-case above, let the useful time-domain sequence comprise n−1 repetitions of S' but without the CP. However, the transmitted BRS still comprises n repetitions.

When receiving this BRS sequence of a different radio-network node using an FFT-window that is positioned with its beginning according to the synchronization of the serving radio-network node 12, an early arrival corresponding to the length of one S' can be tolerated. What happens is that the last repetition of the repetitive sequence, S', now arrives early enough to be positioned at the end of the FFT-window but the unwanted signal, belonging to the next subframe, is not included since a shortened FFT-window is used, 1680 or 1536 samples.

Obviously, even more extreme early arrivals can be measured on by utilizing an FFT-window whose length corresponds to n−2, or less, repetitions of S'. The discussion on adaptability above applies to the early-arrival scenario as well.

Figure 4:
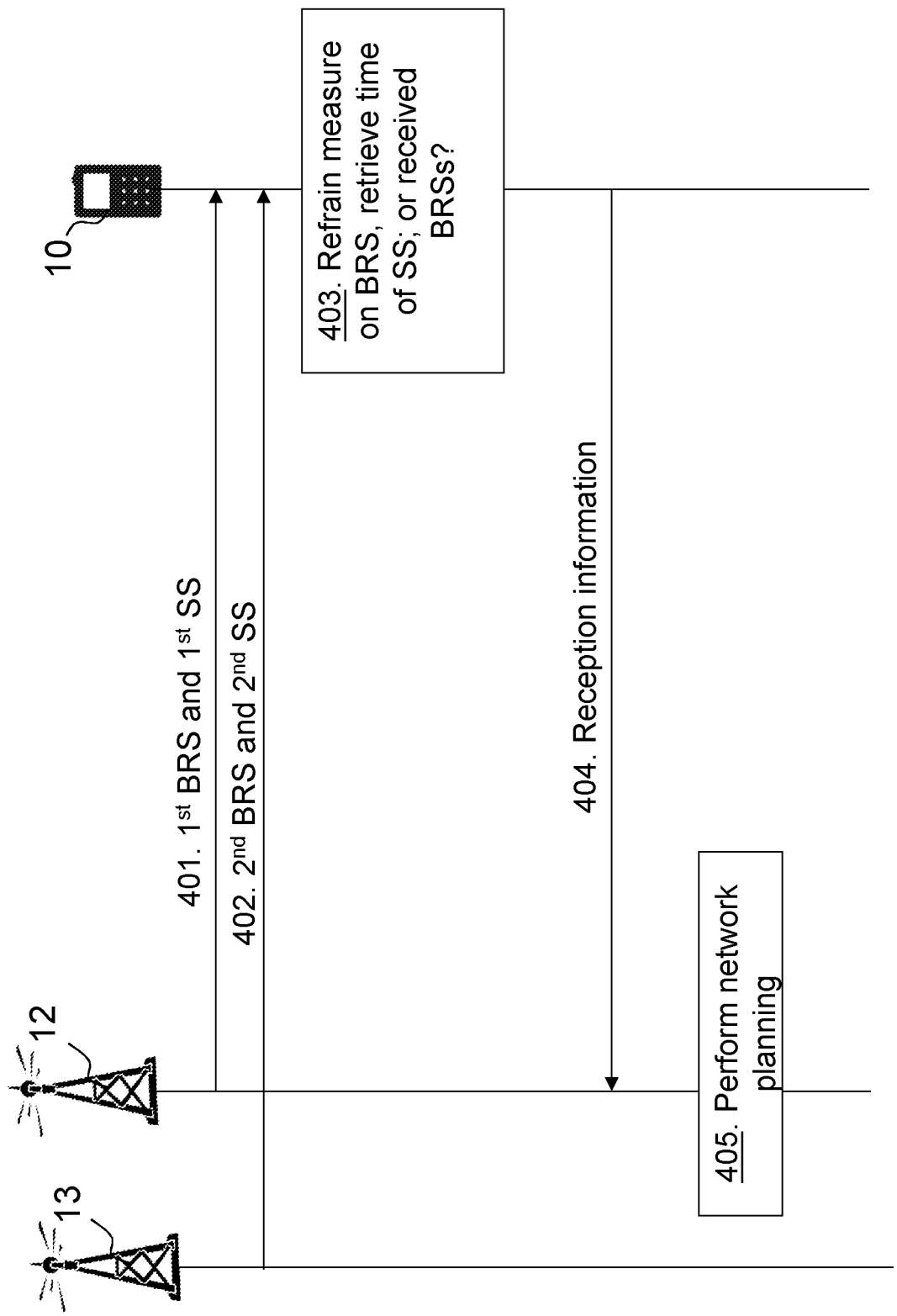
FIG. 4 is a schematic combined flowchart and signaling scheme according to embodiments herein.

FIG. 4 is a combined flowchart and signaling scheme according to some embodiments herein.

Action 401. The first radio-network node 12 transmits signals in the first service area 11, such as a first BRS and a first synchronization signal.

Action 402. The second radio-network node 13 transmits signals in the second service area 14, such as a second BRS and a second synchronization signal.

Action 403. The wireless device 10 being far away from the second radio-network node, may refrain from measuring BRSs that fall outside of the normal CP but obtains reception information of synchronization signals and BRSs, e.g. timing information regarding synchronization or whether the wireless device 10 is able to receive the BRSs. Hence, samples from a previous subframe arrive at the wireless device 10 within an FFT-window of the BRS from the second radio-network node 13. That is, even though the CP can replace the last samples of the BRS when it arrives late, the CP arrives so late that the first sample of the CP arrives later than the first sample of the FFT-window, and hence, the beginning of the FFT-window is "contaminated" by samples from the previous subframe. The wireless device 10 may determine, e.g. based on timing information, obtained via sync-signal correlation or higher-layer signaling from the first radio-network node 12, whether it's useful to try to measure the BRS or not.

Action 404. The wireless device 10 may then report this reception information. E.g. the wireless device 10 may report various sorts of timing information back to the first radio-network node 12. The wireless device 10 may estimate the timing differences between synchronization signals from the different radio-network nodes and thus obtaining the timing information based on the reception of the synchronization signals. This may be done using a time-domain correlator, and hence, does not rely on a specific placement of an FFT-window, which is sensitive to different delays.

Based on a receiver synchronized to the serving first radio-network node 12 the wireless device 10 may additionally or alternatively report which other radio-network nodes the wireless device 10 it is able to measure BRS on without doing any receiver adjustments or utilizing an effective CP.

Action 405. The first radio-network node 12 may then perform network planning based on the received reception information. The reception information of the above kind reported to the first radio-network node 12 can be used as input to adaptively adjusting the method described above in FIG. 2. Furthermore, the first radio-network node 12 may plan which radio-network nodes such as TPs should be used for the wireless device 10. For example, any BRSs that can be measured on, with or without using the novel sequence design and shortened FFT-windows, provide input on how strong the different beams are. Hence, better hand-over handling and joint transmission can be achieved in the wireless communication network.

A purpose of embodiments of FIG. 4 is to provide the wireless communication network 1, such as the first radio-network node 12, with better information on e.g. the timing relation between different radio-network nodes at the wireless device 10. This gives, for example, the possibility to better plan for multi-TP transmission from a radio-network node as well as how to handle hand-overs between radio-network nodes. Examples of different types of knowledge that the wireless communication network 1 may obtain given the above-described embodiments are: which signals from the radio-network nodes can be received using the current synchronization of the wireless device 10; which radio-network nodes can be measured on, e.g. measuring BRS-RP, using a longer effective CP and/or BRSs consisting of repeated sequences in the time-domain, and what is the measured BRS-RP of such a radio-network node if the wireless device 10 were synchronized to it; and how much is the timing offset compared to other radio-network nodes from the received timing information, giving the first radio-network node 12 information on whether to instruct the wireless device to change, based on the received timing information, synchronization to the second radio-network node 13 or to issue a random-access command.

Figure 5:
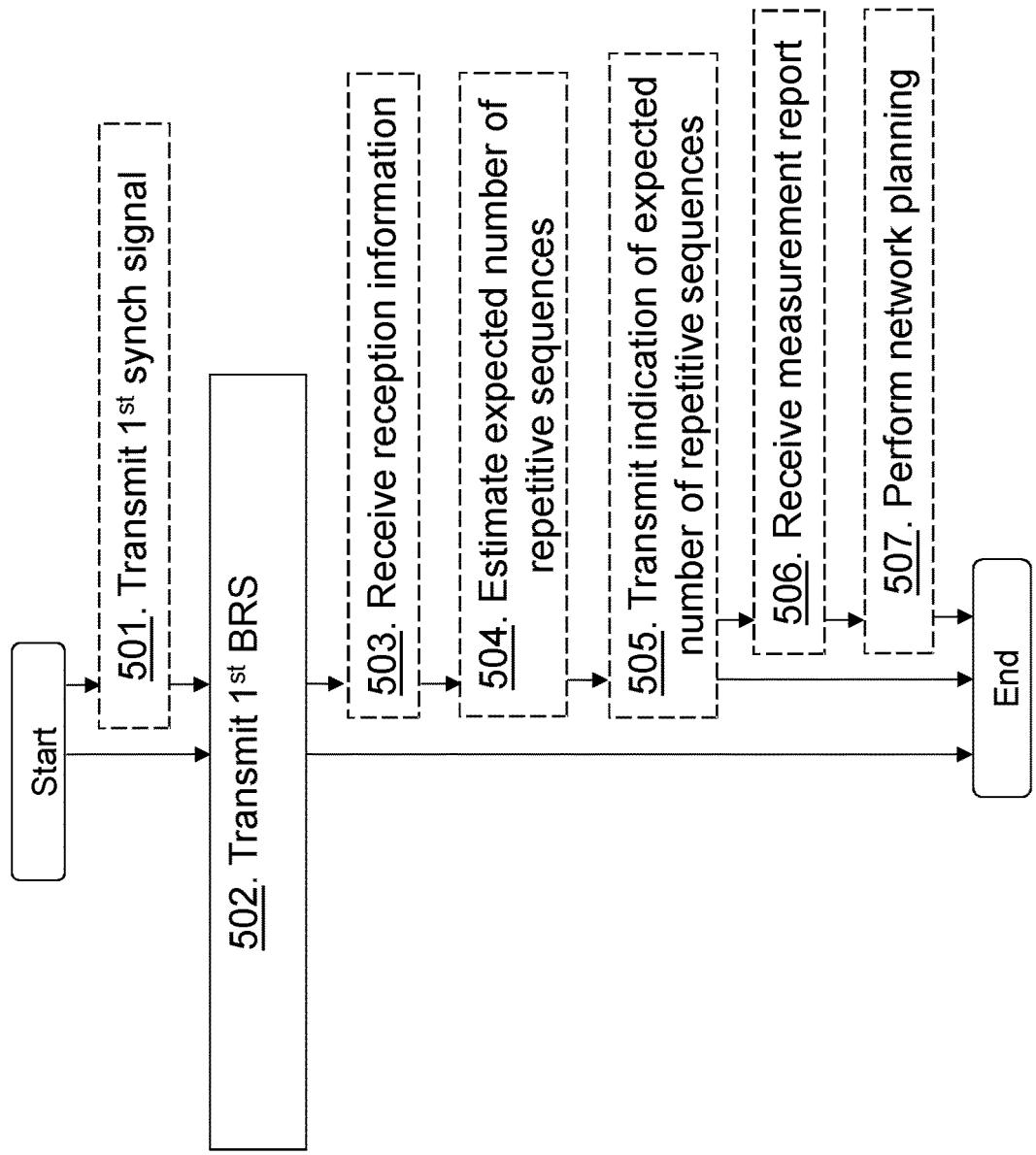
FIG. 5 is a schematic flowchart depicting a method performed by a first radio-network node according to embodiments herein.

FIG. 5 is a schematic flowchart depicting a method performed by the first radio-network node 12 for managing signaling in the wireless communication network 1 according to embodiments herein. The actions do not have to be taken in the order stated below, but may be taken in any suitable order. Actions performed in some embodiments are marked with dashed boxes. Managing signaling may be e.g. determining whether to perform handover or not, whether to transmit data to the wireless device from one or more radio-network nodes; how to perform a handover; how to configure the wireless communication network with the structure of the BRS according to embodiments herein. The first radio-network node 12 provides radio coverage over the first service area in the wireless communication network 1.

Action 501. The first radio-network node 12 may transmit the first synchronization signal over the first service area 11. Hence since the wireless device 10 is within the first service area, the first radio-network node 12 may transmit the first synchronization signal to the wireless device 10. This corresponds to action 202 in FIG. 2.

Action 502. The first radio-network node 12 transmits the first BRS in the first service area, which first BRS comprises a number of repetitive sequences of samples, of equal length, over an original time-domain representation of the first BRS. The first BRS may further comprise a cyclic prefix, which cyclic prefix comprises a part of a last repetitive sequence out of the number of repetitive sequences. Actually, the part is the same last samples for all the repetitive sequences as the sequences are repeated and are thus the same. The original time-domain representation of the first BRS may be one OFDM symbol. This corresponds to action 210 in FIG. 2.

Action 503. The first radio-network node 12 may then receive, from the wireless device 10, reception information regarding the first synchronization signal, and the second synchronization signal from the second radio-network node 13 providing radio coverage over the second service area, which reception information indicates the timing information regarding the timing difference between the received, at the wireless device, first and second synchronization signals.

Action 504. The first radio-network node 12 may further estimate the expected number of repetitive sequences of samples of the second BRS of the second radio-network node 13, the wireless device is able to receive based on the received reception information. This corresponds to action 207 in FIG. 2.

Action 505. The first radio-network node 12 may further transmit, to the wireless device 10, the indication indicating the expected number of repetitive sequences of samples of the second BRS. This corresponds to action 208 in FIG. 2.

Action 506. The first radio-network node 12 may receive the measurement report from the wireless device 10, which measurement report indicates received strength or quality of the first BRS and the second BRS at the wireless device 10.

Action 507. The first radio-network node 12 may then perform network planning based on the measurement report. For example, the first radio-network node 12 may determine whether or how to perform the mobility process, such as a handover, of the wireless device 10 to the second radio-network node 13 based on the measurement report. This corresponds to action 214 in FIG. 2.

Figure 6:
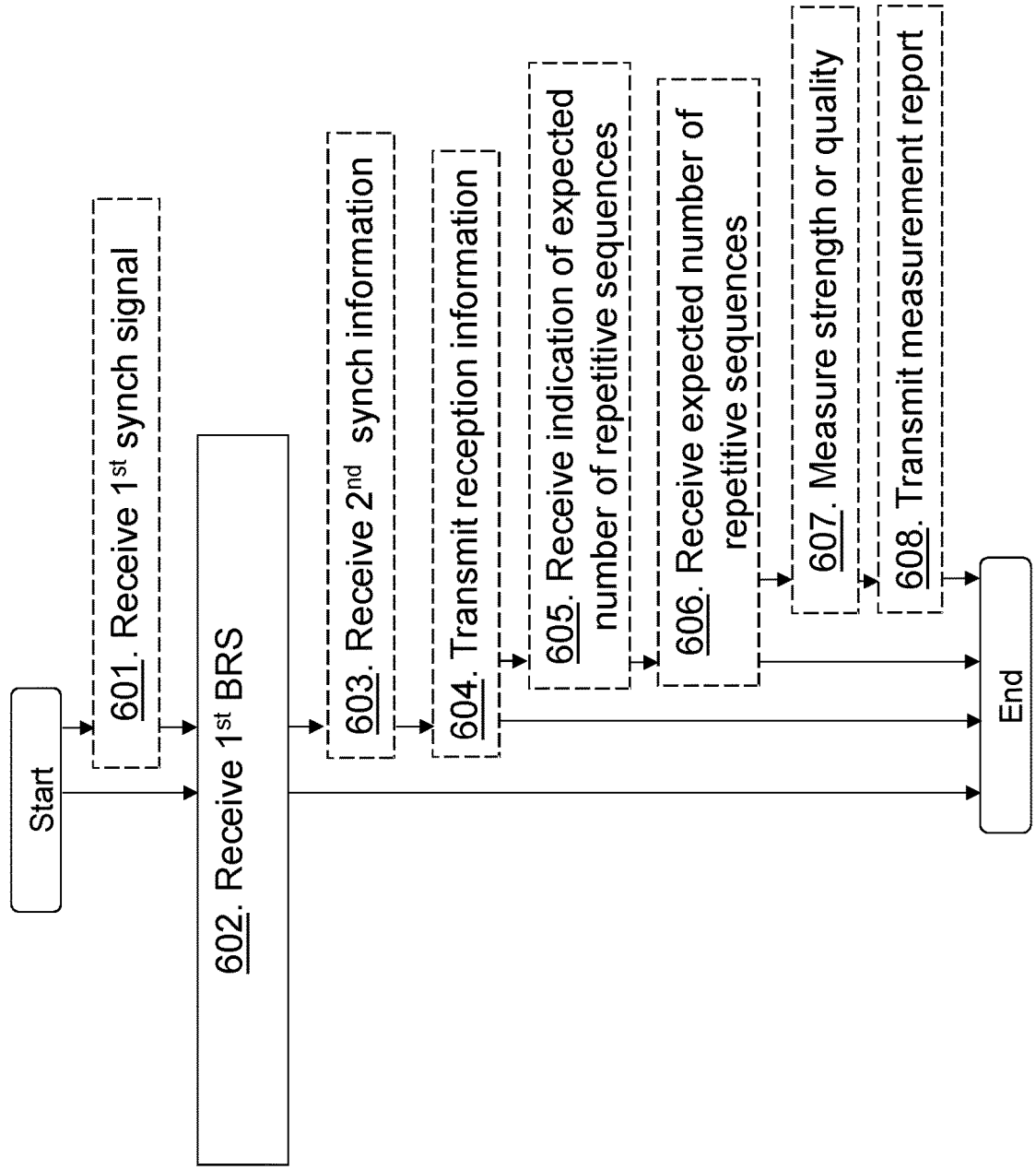
FIG. 6 is a schematic flowchart depicting a method performed by a wireless device according to embodiments herein.

FIG. 6 is a schematic flowchart depicting a method performed by the wireless device 10 for managing signaling in the wireless communication network 1 according to embodiments herein. The actions do not have to be taken in the order stated below, but may be taken in any suitable order. Actions performed in some embodiments are marked with dashed boxes.

Action 601. The wireless device 10 may receive the first synchronization signal from the first radio-network node 12.

Action 602. The wireless device 10 receives, from the first radio-network node 12, the first BRS in the first service area 11 of the wireless communication network 1. The first BRS comprises a number of repetitive sequences of samples, of equal length, over the original time-domain representation of the first BRS. The first BRS may further comprise a cyclic prefix, which cyclic prefix comprises a part of a last repetitive sequence out of the number of repetitive sequences.

Action 603. The wireless device 10 may receive the second synchronization signal from the second radio-network node 13 providing radio coverage over the second service area 14.

Action 604. The wireless device 10 may transmit, to the first radio-network node 12, the reception information regarding the first synchronization signal and the second synchronization signal, which reception information indicates the timing information regarding the timing difference between the received first and second synchronization signals. This corresponds to action 205 in FIG. 2.

Action 605. The wireless device 10 may then receive an indication, from the first radio-network node 12, indicating the expected number of repetitive sequences of samples of the second BRS from the second radio-network node 13 the wireless device is able to receive.

Action 606. The wireless device 10 may further receive, from the second radio-network node, the expected number of repetitive sequences of samples of the second BRS in a Fast Fourier Transform window, which FFT-window has a size based on the received indication.

Action 607. The wireless device 10 may measure a strength or quality of the first and second BRSs. This corresponds to action 212 in FIG. 2.

Action 608. The wireless device 10 may transmit the measurement report to the first radio-network node 12, which measurement report indicates measured strength or quality of the first and second BRSs. This corresponds to action 213 in FIG. 2.

Some embodiments herein thus provides a method performed by the first radio-network node for managing signaling in the wireless communication network. The first radio-network node transmits a beam reference signal, BRS, in a beam/cell/service area in the wireless communication network. The BRS comprises a number of repetitive sequences of samples, of equal length, over an original time-domain representation, such as an OFDM symbol, of the BRS. The BRS may further comprise a cyclic prefix of a part of a last repetitive sequence out of the number of repetitive sequences. A corresponding method performed by the wireless device 10 for managing signaling in the wireless communication network is further provided herein. The wireless device receives a BRS in a beam/cell/service area in the wireless communication network. The BRS comprises a number of repetitive sequences over an original time-domain representation, such as an OFDM symbol, of the BRS. Thus, some embodiments relate to constructing a BRS such that it can be received by a wireless device in synch with the first radio-network node, and then transmitting the BRS utilizing a cyclic prefix (CP) and a normal signal processing. However, the second BRS may, at the same time, be received by the wireless device that is somewhat out-of-synch of the second radio network node utilizing a much longer CP. This is achieved by constructing the first and second BRS such that it comprises a shorter sequence repeated several times during the duration of e.g. one OFDM-symbol.

Figure 7:
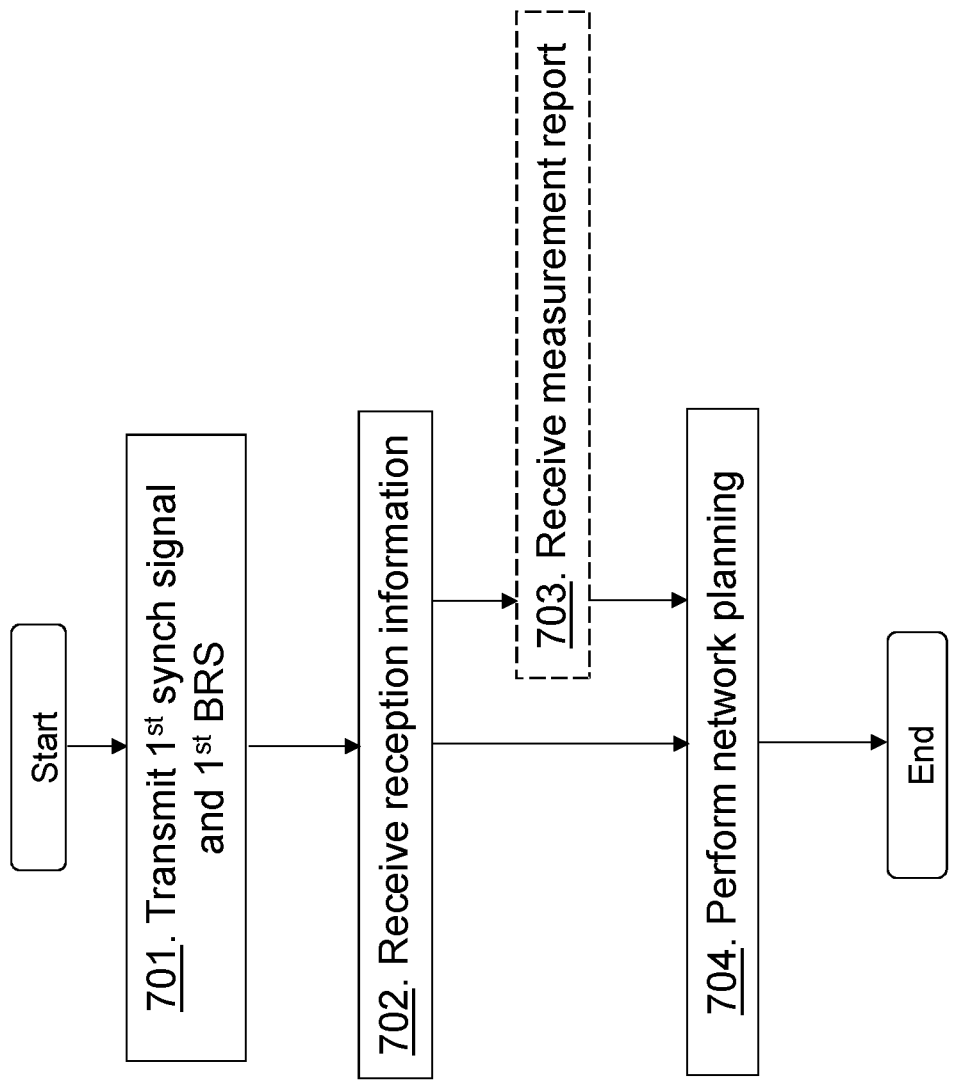
FIG. 7 is a schematic flowchart depicting a method performed by a first radio-network node according to embodiments herein.

FIG. 7 is a schematic flowchart depicting a method performed by the first radio-network node 12 for managing signaling in the wireless communication network 1 according to embodiments herein. The first radio-network node provides radio coverage over the first service area 11 and serves the wireless device 10.

Action 701. The first radio-network node 12 transmits the first BRS and the first synchronization signal to the wireless device 10. This corresponds to action 401 in FIG. 4.

Action 702. The first radio-network node 12 receives, from the wireless device 10, reception information regarding the first BRS and the first synchronization signal, and the second BRS and the second synchronization signal from the second radio-network node providing radio coverage over the second service area 14. The reception information indicates the timing information regarding the timing difference between the received, at the wireless device, first and second synchronization signals, and/or the reception information indicates that the wireless device 10 has received the first and the second BRS.

Action 703. The first radio-network node 12 may receive the measurement report from the wireless device 10, which measurement report indicates the strength or quality of the first and the second BRS.

Action 704. The first radio-network node 12 performs network planning based on the reception information. Additionally, the first radio-network node 12 may perform the network planning by further taking the received measurement report into account. The first radio-network node 12 may perform the network planning by determining, based on the received reception information, whether a random-access procedure or a switch of synchronization signals which to synchronize to will be required when switching between the first and second radio-network nodes. This corresponds to action 405 in FIG. 4.

Figure 8:
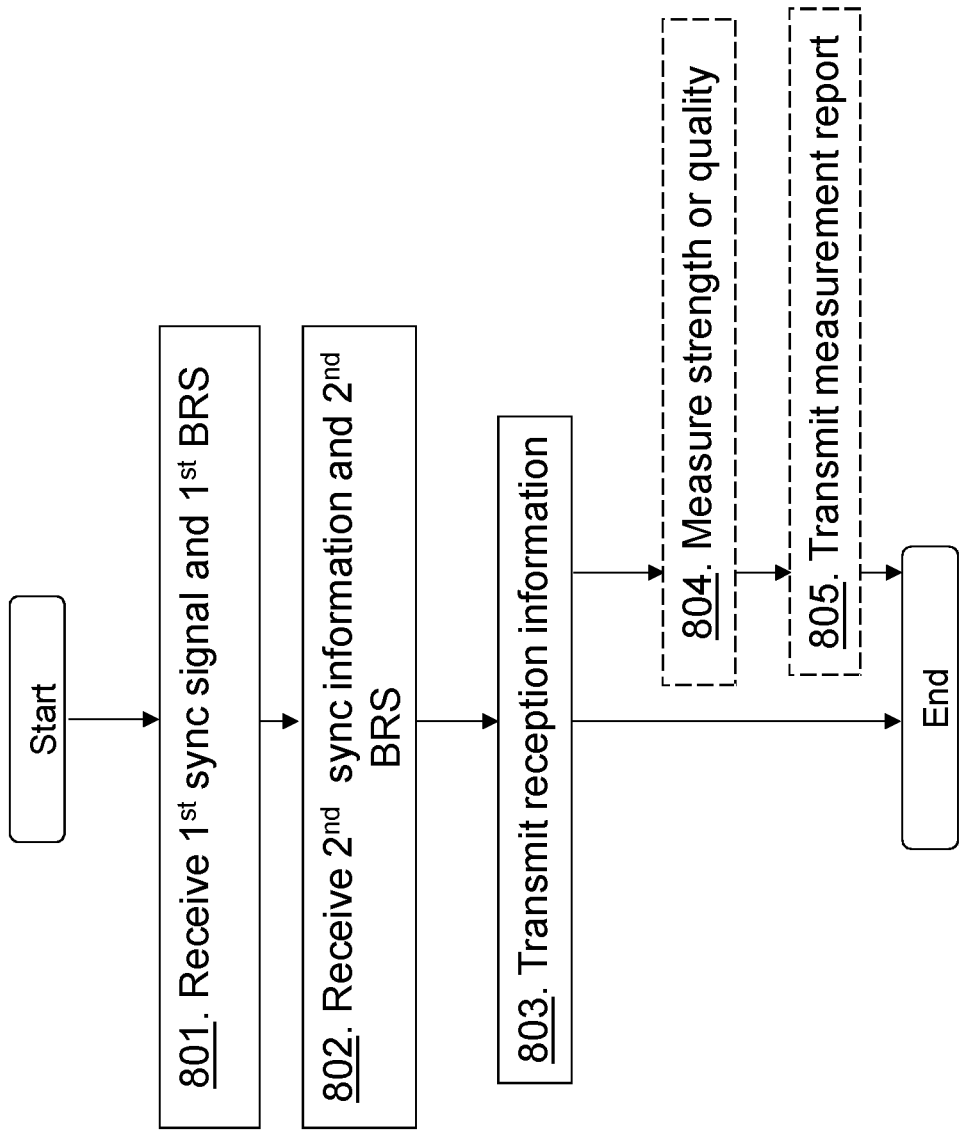
FIG. 8 is a schematic flowchart depicting a method performed by a wireless device according to embodiments herein.

FIG. 8 is a schematic flowchart depicting a method performed by the wireless device 10 for managing signaling in the wireless communication network 1 according to embodiments herein. The actions do not have to be taken in the order stated below, but may be taken in any suitable order. Actions performed in some embodiments are marked with dashed boxes. The wireless device 10 is served by the first radio-network node providing radio coverage over the first service area 11

Action 801. The wireless device 10 receives the first BRS and the first synchronization signal from the first radio-network node 12.

Action 802. The wireless device 10 receives the second BRS and the second synchronization signal from the second radio-network node 13 providing radio coverage over the second service area 14.

Action 803. The wireless device 10 then transmits, to the first radio-network node 12, the reception information regarding the first BRS and the first synchronization signal, and the second BRS and the second synchronization signal. The reception information indicates the timing information regarding the timing difference between the received first and second synchronization signals, and/or the reception information indicates that the wireless device 10 has received the first and the second BRS. There may be multiple BRSs from each node. This corresponds to action 404 in FIG. 4.

Action 804. The wireless device 10 measures the strength or quality of the first and second BRS. For example, the wireless device may measure received power or energy.

Action 805. The wireless device 10 transmits, to the first radio-network node, the measurement report indicating the measured strength or quality of the first and the second BRS.

Hence, a method performed by the wireless device for managing signaling in the wireless communication network 1 is herein provided. The wireless device is served by the first radio-network node providing radio coverage over the first service area.

The wireless device receives the first BRS and the first synchronization signal from the first radio-network node. Furthermore, the wireless device receives the second BRS and the second synchronization signal from the second radio-network node providing radio coverage over the second service area. The wireless device transmits to the first radio-network node reception information regarding the received first BRS or synchronization signal and the received second BRS or synchronization signal, which reception information indicates a timing difference between the received synchronization signals or that the wireless device received the first and the second BRS.

A corresponding method performed by the first radio-network node for managing signaling in the wireless communication network is also herein provided. The first radio-network node provides radio coverage over the first service area and serves the wireless device. The first radio-network node transmits the first BRS and the first synchronization signal to the wireless device. The first radio-network node then receives, from the wireless device, reception information regarding the first BRS or synchronization signal and a second BRS or synchronization signal from the second radio-network node providing radio coverage over the second service area, which reception information indicates the timing difference between the received synchronization signals or that the wireless device received the first and the second BRS.

The first radio-network node may then deduce from the received reception information whether e.g. a random-access procedure or a reselection of utilized synchronization signals will be required when switching between the radio-network nodes.

Thus some embodiments herein relate to analyzing the timing difference between synchronization signals coming from different radio-network nodes and reporting the timing difference back to the first radio-network node. Alternatively, the first radio-network node analyses which BRSs, and thus radio-network nodes, the wireless device can connect to simultaneously based on the reception information. This will enable the radio-network node to perform network planning e.g. deduce which BRSs that a wireless device can measure on without any special arrangements, and subsequently, which radio-network nodes the wireless device can be connected to simultaneously or whether a random-access procedure or reselection of utilized synchronization signals will be required when switching between the radio-network nodes.

Figure 9:
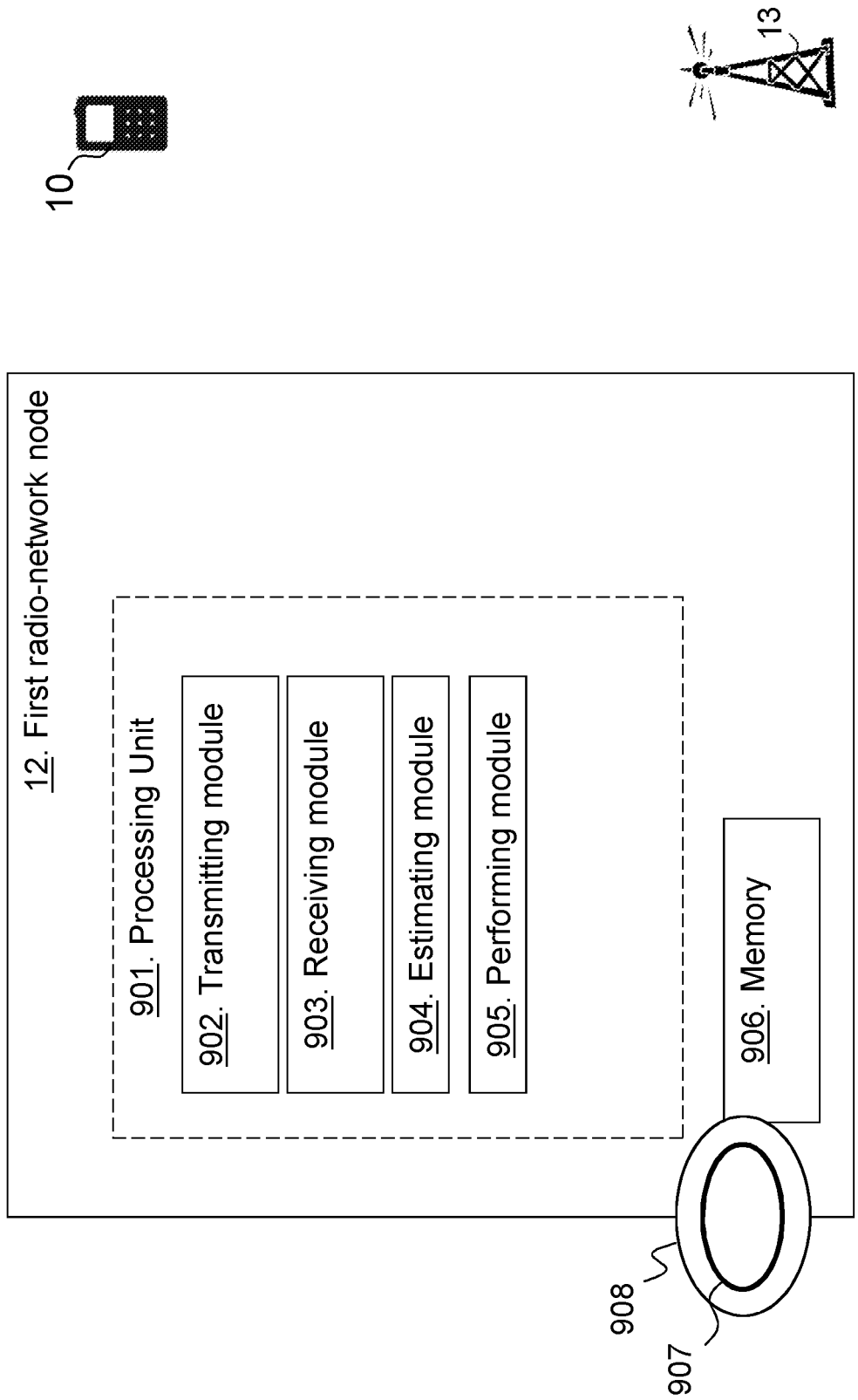
FIG. 9 is a block diagram depicting a radio-network node according to embodiments herein.

FIG. 9 is a block diagram depicting the first radio-network node 12 for managing signaling in the wireless communication network 1 according to embodiments herein. The first radio-network node is configured to provide radio coverage over the first service area in the wireless communication network 1.

The first radio-network node 12 may comprise a processing unit 901, e.g. one or more processors.

The first radio-network node 12 may comprise a transmitting module 902 such as a transmitter or a transceiver. The first radio-network node 12, the processing unit 901 and/or the transmitting module 902 may be configured to transmit the first BRS in the first service area 11, e.g. to the wireless device 10. The first BRS comprises the number of repetitive sequences of samples, of equal length, over the original time-domain representation of the first BRS. The first BRS further comprises a cyclic prefix, which cyclic prefix comprises a part, e.g. last part, of a last repetitive sequence, or any repetitive sequence, out of the number of repetitive sequences. The first radio-network node 12, the processing unit 901 and/or the transmitting module 902 may further be configured to transmit the first synchronization signal over the first service area 11. The original time-domain representation of the first BRS may be an OFDM symbol.

The first radio-network node 12 may comprise a receiving module 903 such as a receiver or the transceiver. The first radio-network node 12, the processing unit 901 and/or the receiving module 903 may be configured to receive from the wireless device 10, reception information regarding the first synchronization signal and the second synchronization signal from the second radio-network node 13 providing radio coverage over the second service area 14. The reception information may indicate the timing information regarding the timing difference between the received, at the wireless device, first and second synchronization signals.

The first radio-network node 12 may comprise an estimating module 904. The first radio-network node 12, the processing unit 901 and/or the estimating module 904 may be configured to estimate the expected number of repetitive sequences of samples of the second BRS of the second radio-network node 13, the wireless device 10 is able to receive based on the received reception information.

The first radio-network node 12, the processing unit 901 and/or the transmitting module 902 may be configured to transmit to the wireless device 10, the indication indicating the expected number of repetitive sequences of samples of the second BRS.

The first radio-network node 12, the processing unit 901 and/or the receiving module 903 may be configured to receive the measurement report from the wireless device, which measurement report indicates received strength or quality of the first BRS and the second BRS at the wireless device 10.

The first radio-network node 12 may comprise a performing module 905. The first radio-network node 12, the processing unit 901 and/or the performing module 905 may be configured to perform the network planning based on the measurement report. For example, the first radio-network node 12, the processing unit 901 and/or the performing module 905 may be configured to determine whether or how to perform a mobility process of the wireless device 10 to the second radio-network node 13 based on the measurement report.

According to some embodiments the first radio-network node is configured to provide radio coverage over the first service area 11 and to serve the wireless device 10.

The first radio-network node 12, the processing unit 901 and/or the transmitting module 902 may be configured to transmit the first BRS and the first synchronization signal to the wireless device 10.

The first radio-network node 12, the processing unit 901 and/or the receiving module 903 may be configured to receive from the wireless device 10, reception information regarding the first BRS and the first synchronization signal, and the second BRS and the second synchronization signal from the second radio-network node 13 providing radio coverage over the second service area 14. The reception information indicates the timing information regarding the timing difference between the received, at the wireless device, first and second synchronization signals, and/or the reception information indicates that the wireless device 10 has received the first and the second BRS.

As stated above, the first radio-network node 12, the processing unit 901 and/or the performing module 905 may be configured to perform the network planning based on the reception information.

The first radio-network node 12, the processing unit 901 and/or the receiving module 903 may be configured to receive the measurement report from the wireless device which measurement report indicates the strength or quality of the first and the second BRS. As stated above, the first radio-network node 12, the processing unit 901 and/or the performing module 905 may be configured to perform the network planning based on the received measurement report.

As stated above, the first radio-network node 12, the processing unit 901 and/or the performing module 905 may be configured to perform the network planning by being configured to determine, based on the received reception information, whether a random-access procedure or a switch of synchronization signals which to synchronize to will be required when switching between the first and second radio-network nodes.

The first radio-network node 12 further comprises a memory 906. The memory comprises one or more units to be used to store data on, such as number of sequences expected to receive, CP, BRSs, measurements, timing information, reception information, applications to perform the methods disclosed herein when being executed, and similar.

The methods according to the embodiments described herein for the first radio-network node 12 are respectively implemented by means of e.g. a computer program or a computer program product, comprising instructions, i.e., software code portions, which, when executed on at least one processor, cause the at least one processor to carry out the actions described herein, as performed by the first radio-network node 12. The computer program 907 may be stored on a computer-readable storage medium 908, e.g. a disc or similar. The computer-readable storage medium 908, having stored thereon the computer program, may comprise the instructions which, when executed on at least one processor, cause the at least one processor to carry out the actions described herein, as performed by the first radio-network node 12. In some embodiments, the computer-readable storage medium may be a non-transitory computer-readable storage medium.

Figure 10:
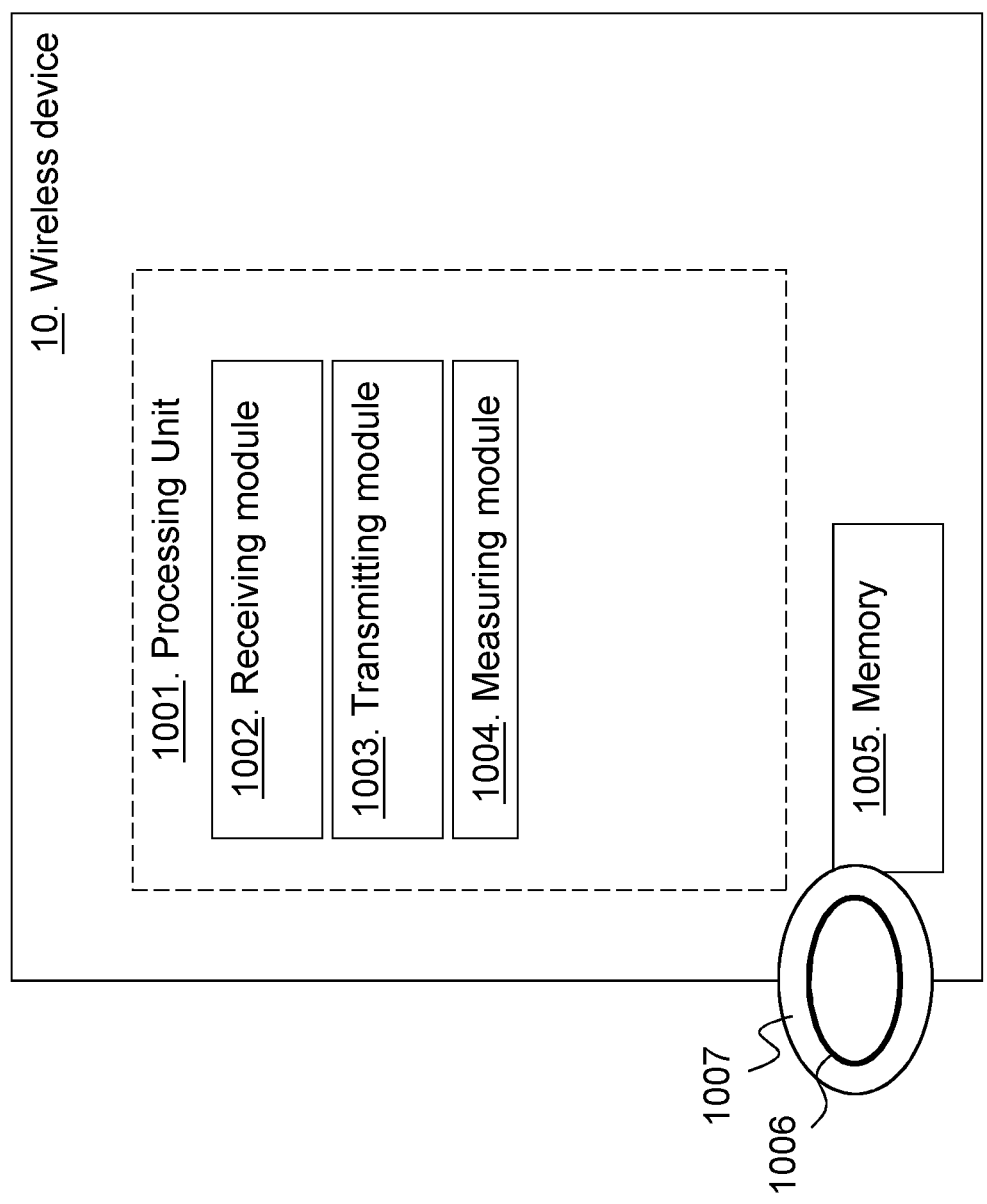
FIG. 10 is a block diagram depicting a wireless device according to embodiments herein.

FIG. 10 is a block diagram depicting the wireless device 10 for managing signaling in the wireless communication network 1 according to embodiments herein.

The wireless device 10 may comprise a processing unit 1001, e.g. one or more processors, configured to perform the methods herein.

The wireless device 10 may comprise a receiving module 1002 such as a receiver or a transceiver. The wireless device 10, the processing unit 1001 and/or the receiving module 1002 may be configured to receive from the first radio-network node 12, the first BRS in the first service area 11 of the wireless communication network, which first BRS comprises the number of repetitive sequences of samples, of equal length, over the original time-domain representation of the first BRS. The first BRS may further comprise a cyclic prefix, which cyclic prefix comprises the part of the last repetitive sequence out of the number of repetitive sequences.

The wireless device 10, the processing unit 1001 and/or the receiving module may be configured to receive the first synchronization signal from the first radio-network node 12. The wireless device 10, the processing unit 1001 and/or the receiving module 1002 may further be configured to receive the second synchronization signal from the second radio-network node 13 providing radio coverage over the second service area 14.

The wireless device 10 may comprise a transmitting module 1003 such as a transmitter or the transceiver. The wireless device 10, the processing unit 1001 and/or the transmitting module 1003 may be configured to transmit to the first radio-network node 12, reception information regarding the first synchronization signal and the second synchronization signal, which reception information indicates the timing information regarding the timing difference between the received first and second synchronization signals.

The wireless device 10, the processing unit 1001 and/or the receiving module may be configured to receive the indication, from the first radio-network node 12, indicating the expected number of repetitive sequences of samples of the second BRS from the second radio-network node 13 the wireless device is able to receive.

The wireless device 10, the processing unit 1001 and/or the receiving module may be configured to receive from the second radio-network node 13, the expected number of repetitive sequences of samples of the second BRS in the FFT-window, which FFT-window has a size based on the received indication.

The wireless device 10 may comprise a measuring module 1004. The wireless device 10, the processing unit 1001 and/or the measuring module 1004 may be configured to measure the strength or quality of the first and second BRSs.

The wireless device 10, the processing unit 1001 and/or the transmitting module may be configured to transmit the measurement report to the first radio-network node 12, which measurement report indicates measured strength or quality of the first and second BRSs.

In some embodiments, the wireless device is configured to be served by the first radio-network node 12 providing radio coverage over the first service area 11.

The wireless device 10, the processing unit 1001 and/or the receiving module may be configured to receive the first BRS and the first synchronization signal from the first radio-network node 12. The wireless device 10, the processing unit 1001 and/or the receiving module 1002 may further be configured to receive the second BRS and the second synchronization signal from the second radio-network node 13 providing radio coverage over the second service area 14.

The wireless device 10, the processing unit 1001 and/or the transmitting module may be configured to transmit to the first radio-network node 12, reception information regarding the first BRS and the first synchronization signal, and the second BRS and the second synchronization signal. The reception information may indicate the timing information regarding the timing difference between the received first and second synchronization signals, and/or the reception information may indicate that the wireless device 10 has received the first and the second BRS.

The wireless device 10, the processing unit 1001 and/or the measuring module may be configured to measure the strength or quality of the first and second BRS, respectively. The wireless device 10, the processing unit 1001 and/or the transmitting module 1003 may be configured to transmit to the first radio-network node 12, the measurement report indicating the measured strength or quality of the first and the second BRS.

The wireless device 10 further comprises a memory 1005. The memory comprises one or more units to be used to store data on, such as number of sequences expected to receive, CP, BRSs, measurements, timing information, reception information, applications to perform the methods disclosed herein when being executed, and similar.

The methods according to the embodiments described herein for the wireless device 10 are respectively implemented by means of e.g. a computer program 1006 or a computer program product, comprising instructions, i.e., software code portions, which, when executed on at least one processor, cause the at least one processor to carry out the actions described herein, as performed by the wireless device 10. The computer program 1006 may be stored on a computer-readable storage medium 1007, e.g. a disc or similar. The computer-readable storage medium 1007, having stored thereon the computer program, may comprise the instructions which, when executed on at least one processor, cause the at least one processor to carry out the actions described herein, as performed by the wireless device 10. In some embodiments, the computer-readable storage medium may be a non-transitory computer-readable storage medium.

In some embodiments a more general term "radio-network node" is used and it can correspond to any type of radio-network node or any network node, which communicates with a UE and/or with another network node. Examples of network nodes are NodeB, MeNB, SeNB, a network node belonging to Master cell group (MCG) or Secondary cell group (SCG), base station (BS), multi-standard radio (MSR) radio node such as MSR BS, eNodeB, network controller, radio-network controller (RNC), base station controller (BSC), relay, donor node controlling relay, base transceiver station (BTS), access point (AP), transmission points, transmission nodes, Remote radio Unit (RRU), Remote Radio Head (RRH), nodes in distributed antenna system (DAS), core network node (e.g. Mobile Switching Centre (MSC), Mobility Management Entity (MME) etc), Operation and Maintenance (O&M), Operation Sub System OSS, Self-Organizing Network (SON), positioning node, e.g. Evolved Serving Mobile Location Center (E-SMLC), Minimization of drive tests (MDT), etc.

In some embodiments the non-limiting term user equipment (UE) is used and it refers to any type of wireless device communicating with a network node and/or with another UE in a cellular or mobile communication system. Examples of UE are target device, device-to-device (D2D) UE, proximity-capable UE (aka ProSe UE), machine-type UE or UE capable of machine-to-machine (M2M) communication, PDA, PAD, Tablet, mobile terminals, smart phone, laptop-embedded equipped (LEE), laptop-mounted equipment (LME), USB dongles, etc.

The embodiments are described for NR. However the embodiments are applicable to any RAT or multi-RAT systems, where the UE receives and/or transmit signals (e.g. data) e.g. LTE, LTE FDD/TDD, WCDMA/HSPA, GSM/GERAN, Wi Fi, WLAN, CDMA2000, etc.

As will be readily understood by those familiar with communications design, that functions means or modules may be implemented using digital logic and/or one or more microcontrollers, microprocessors, or other digital hardware. In some embodiments, several or all of the various functions may be implemented together, such as in a single application-specific integrated circuit (ASIC), or in two or more separate devices with appropriate hardware and/or software interfaces between them. Several of the functions may be implemented on a processor shared with other functional components of a wireless device or network node, for example.

Alternatively, several of the functional elements of the processing means discussed may be provided through the use of dedicated hardware, while others are provided with hardware for executing software, in association with the appropriate software or firmware. Thus, the term "processor" or "controller" as used herein does not exclusively refer to hardware capable of executing software and may implicitly include, without limitation, digital signal processor (DSP) hardware, read-only memory (ROM) for storing software, random-access memory for storing software and/or program or application data, and non-volatile memory. Other hardware, conventional and/or custom, may also be included. Designers of communications devices will appreciate the cost, performance, and maintenance trade-offs inherent in these design choices.

It will be appreciated that the foregoing description and the accompanying drawings represent non-limiting examples of the methods and apparatus taught herein. As such, the apparatus and techniques taught herein are not limited by the foregoing description and accompanying drawings. Instead, the embodiments herein are limited only by the following claims and their legal equivalents.

The invention claimed is:

1. A method performed by a wireless device for managing signaling in a wireless communication) A method performed by a first radio-network node for managing signaling in a wireless communication network, wherein the first radio-network node provides radio coverage over a first service area in the wireless communication network, the method comprising:
   transmitting a first beam reference signal (BRS) in the first service area, the first BRS comprising, within an Orthogonal Frequency Division Multiplexing (OFDM) symbol, an integer number of repetitive sequences of samples, of equal length, over an original time-domain representation of the first BRS, the integer number being greater than one.

2. The method of claim 1, wherein the first BRS further comprises a cyclic prefix, the cyclic prefix comprising a part of a last repetitive sequence out of the number of repetitive sequences.

3. The method of claim 1, further comprising:
   transmitting a first synchronization signal over the first service area;
   receiving, from a wireless device, reception information regarding the first synchronization signal, and a second synchronization signal from a second radio-network node providing radio coverage over a second service area, wherein the reception information indicates a timing information regarding a timing difference between the first and second synchronization signals as received at the wireless device;

estimating a number of repetitive sequences of samples of a second BRS of the second radio-network node that the wireless device is expected to be able to receive, based on the received reception information; and transmitting, to the wireless device, an indication indicating the number of repetitive sequences of samples of the second BRS.

4. The method of claim 3, further comprising receiving a measurement report from the wireless device, wherein the measurement report indicates received strength or quality of the first BRS and the second BRS at the wireless device; and performing network planning based on the measurement report.

5. The method of claim 1, wherein the original time-domain representation of the first BRS is an orthogonal frequency-division multiplexing (OFDM) symbol.

6. A method performed by a wireless device for managing signaling in a wireless communication network; the method comprising:

receiving, from a first radio-network node, a first beam reference signal (BRS) in a first service area of the wireless communication network, wherein the first BRS comprises, within an Orthogonal Frequency Division Multiplexing (OFDM) symbol, an integer number of repetitive sequences of samples, of equal length, over an original time-domain representation of the first BRS, the integer number being greater than one.

7. The method of claim 6, wherein the first BRS further comprises a cyclic prefix, the cyclic prefix comprising a part of a last repetitive sequence out of the number of repetitive sequences.

8. The method of claim 6, further comprising:

receiving a first synchronization signal from the first radio-network node;

receiving a second synchronization signal from a second radio-network node providing radio coverage over a second service area;

transmitting, to the first radio-network node, reception information regarding the first synchronization signal and the second synchronization signal, wherein the reception information indicates a timing information regarding a timing difference between the received first and second synchronization signals.

9. The method of claim 8, further comprising receiving an indication, from the first radio-network node, indicating a number of repetitive sequences of samples of a second BRS from the second radio- network node that the wireless device is expected to be able to receive; and receiving, from the second radio-network node, the indicated number of repetitive sequences of samples of the second BRS in a Fast Fourier Transform (FFT) window, which FFT-window has a size based on the received indication.

10. The method of claim 9, further comprising measuring a strength or quality of the first and second BRSs; and transmitting a measurement report to the first radio-network node, wherein the measurement report indicates measured strength or quality of the first and second BRSs.

11. A first radio-network node for managing signaling in a wireless communication network, the first radio-network node being configured to provide radio coverage over a first service area in the wireless communication network; the first radio-network node comprising a processing circuit; and a memory circuit operatively coupled to the processing circuit and comprising programming instructions for execution by the processing circuit whereby the first radio-network node is configured to transmit a first beam reference signal (BRS) in the first service area, which first BRS comprises, within an Orthogonal Frequency Division Multiplexing (OFDM) symbol, an integer number of repetitive sequences of samples, of equal length, over an original time-domain representation of the first BRS, the integer number being greater than one.

12. A first radio-network node according to claim 11, wherein the first BRS further comprises a cyclic prefix, which cyclic prefix comprises a part of a last repetitive sequence out of the number of repetitive sequences.

13. A first radio-network node according to claim 11, wherein the first radio-network node is further configured to:

transmit a first synchronization signal over the first service area;

receive from a wireless device, reception information regarding the first synchronization signal, and a second synchronization signal from a second radio-network node providing radio coverage over a second service area, which reception information indicates a timing information regarding a timing difference between the received, at the wireless device, first and second synchronization signals;

estimate an expected number of repetitive sequences of samples of a second BRS of the second radio-network node, the wireless device is able to receive based on the received reception information; and to transmit to the wireless device, an indication indicating the expected number of repetitive sequences of samples of the second BRS.

14. A first radio-network node according to claim 13, wherein the first radio-network node is further configured to:

receive a measurement report from the wireless device, which measurement report indicates received strength or quality of the first BRS and the second BRS at the wireless device; and to perform network planning based on the measurement report.

15. A first radio-network node according to claim 11, wherein the original time-domain representation of the first BRS is an orthogonal frequency-division multiplexing (OFDM) symbol.

16. A wireless device for managing signaling in a wireless communication network, the wireless device comprising:

a processing circuit; and a memory circuit operatively coupled to the processing circuit and comprising programming instructions for execution by the processing circuit whereby the first radio-network node is configured to receive, from a first radio- network node, a first beam reference signal (BRS) in a first service area of the wireless communication network, which first BRS comprises, within an Orthogonal Frequency Division Multiplexing (OFDM)

symbol, an integer number of repetitive sequences of samples, of equal length, over an original time-domain representation of the first BRS, the integer number being greater than one.

17. The wireless device of claim 16, wherein the first BRS further comprises a cyclic prefix, which cyclic prefix comprises a part of a last repetitive sequence out of the number of repetitive sequences.

18. The wireless device of claim 16, wherein the wireless device is further configured to:
receive a first synchronization signal from the first radio-network node;
receive a second synchronization signal from a second radio-network node providing radio coverage over a second service area; and to
transmit to the first radio-network node, reception information regarding the first synchronization signal and the second synchronization signal, which reception information indicates a timing information regarding a timing difference between the received first and second synchronization signals.

19. The wireless device of claim 18, wherein the wireless device is further configured to
receive an indication, from the first radio-network node, indicating a number of repetitive sequences of samples of a second BRS from the second radio-network node that the wireless device is expected to be able to receive; and to
receive from the second radio-network node, the expected number of repetitive sequences of samples of the second BRS in a Fast Fourier Transform (FFT) window, wherein the FFT window has a size based on the received indication.

20. The wireless device of claim 19, wherein the wireless device is further configured to:
measure a strength or quality of the first and second BRSs; and to
transmit a measurement report to the first radio-network node, which measurement report indicates measured strength or quality of the first and second BRSs.

21. A non-transitory computer-readable medium comprising, stored thereupon, a computer program comprising instructions that, when executed on at least one processor of a wireless device operating in a wireless communication network, cause the wireless device to:
receive, from a first radio-network node, a first beam reference signal (BRS) in a first service area of the wireless communication network, wherein the first BRS comprises, within an Orthogonal Frequency Division Multiplexing (OFDM) symbol, an integer number of repetitive sequences of samples, of equal length, over an original time-domain representation of the first BRS, the integer number being greater than one.

22. A non-transitory computer-readable medium comprising, stored thereupon, a computer program comprising instructions that, when executed on at least one processor of a first radio-network node operating in a wireless communication network and providing radio coverage over a first service area in the wireless communication network, cause the radio-network node to:
transmit a first beam reference signal (BRS) in the first service area, the first BRS comprising, within an Orthogonal Frequency Division Multiplexing (OFDM) symbol, an integer number of repetitive sequences of samples, of equal length, over an original time-domain representation of the first BRS, the integer number being greater than one.

* * * * *